– United States Patent (12)
Ichida et al.

(10) Patent No.: US 12,057,736 B2
(45) Date of Patent: Aug. 6, 2024

(54) LAMINATED CORE FOR ROTARY ELECTRIC MACHINE, AND ROTARY ELECTRIC MACHINE

(71) Applicant: Mitsubishi Electric Corporation, Tokyo (JP)

(72) Inventors: Takafumi Ichida, Tokyo (JP); Kazuya Kumagai, Tokyo (JP); Yuta Mori, Tokyo (JP); Yoshinori Iwanabe, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 694 days.

(21) Appl. No.: 17/049,459

(22) PCT Filed: Apr. 15, 2019

(86) PCT No.: PCT/JP2019/016164
§ 371 (c)(1),
(2) Date: Oct. 21, 2020

(87) PCT Pub. No.: WO2019/225211
PCT Pub. Date: Nov. 28, 2019

(65) Prior Publication Data
US 2021/0281127 A1 Sep. 9, 2021

(30) Foreign Application Priority Data

May 22, 2018 (JP) .................................. 2018-097525

(51) Int. Cl.
*H02K 1/14* (2006.01)
*H02K 3/52* (2006.01)
*H02K 15/02* (2006.01)

(52) U.S. Cl.
CPC ............. *H02K 1/148* (2013.01); *H02K 3/522* (2013.01); *H02K 15/022* (2013.01); *H02K 2201/09* (2013.01); *H02K 2213/03* (2013.01)

(58) Field of Classification Search
CPC .......... H02K 1/146; H02K 1/148; H02K 1/18; H02K 1/185
(Continued)

(56) References Cited

U.S. PATENT DOCUMENTS 6,369,687 B1 * 4/2002 Akita ..................... H02K 1/148
                                                    310/216.011
6,646,535 B2    11/2003 Miyake et al.
(Continued)

FOREIGN PATENT DOCUMENTS

CN    101523696 A    9/2009
JP    H11346447 A    12/1999
(Continued)

OTHER PUBLICATIONS

International Search Report (PCT/ISA/210), with translation, and Written Opinion (PCT/ISA/237) mailed on Jul. 9, 2019, by the Japan Patent Office as the International Searching Authority for International Application No. PCT/JP2019/016164.
(Continued)

*Primary Examiner* — Daniel C Puentes
*Assistant Examiner* — Minki Chang
(74) *Attorney, Agent, or Firm* — BUCHANAN INGERSOLL & ROONEY PC

(57) ABSTRACT

When a laminated core is formed in an annular shape, a radially inner part of a contact surface formed by a projecting end of a first core piece and a recessed end of another first core piece that are adjacent in a circumferential direction, and a radially inner part of a contact surface formed by a projecting end of a second core piece and a recessed end
(Continued)

of another second core piece that are adjacent in the circumferential direction, are positioned in a plane including a center axis of the annular laminated core.

14 Claims, 27 Drawing Sheets

(58) Field of Classification Search
USPC .................. 310/216.008, 216.009, 216.048
See application file for complete search history.

(56) References Cited

U.S. PATENT DOCUMENTS

| 2002/0130750 | A1 | 9/2002 | Miyake et al. | |
|---|---|---|---|---|
| 2007/0222324 | A1* | 9/2007 | Fukui | H02K 9/223 |
| | | | | 310/260 |
| 2009/0026873 | A1* | 1/2009 | Matsuo | H02K 15/022 |
| | | | | 310/216.019 |
| 2015/0084476 | A1* | 3/2015 | Jang | H02K 1/146 |
| | | | | 310/216.016 |
| 2019/0190325 | A1* | 6/2019 | Nakahara | H02K 15/022 |
| 2019/0222081 | A1* | 7/2019 | Kato | H02K 3/345 |

FOREIGN PATENT DOCUMENTS

| JP | 2002272027 A | 9/2002 |
|---|---|---|
| JP | 2010268586 A | 11/2010 |
| JP | 2011172335 A | 9/2011 |
| JP | 2018046617 A | 3/2018 |

OTHER PUBLICATIONS

Office Action issued CN Application No. 201980032727.9; Mailed Nov. 18, 2022. 19 Pages with English Translation.
Office Action dated May 25, 2021, issued in corresponding Japanese Patent Application No. 2020-521092, 10 pages including 5 pages of English translation.

* cited by examiner

LAMINATED CORE FOR ROTARY ELECTRIC MACHINE, AND ROTARY ELECTRIC MACHINE

TECHNICAL FIELD

The present disclosure relates to a laminated core for a rotary electric machine, and the rotary electric machine including the laminated core.

BACKGROUND ART

Conventionally, as a laminated core for a rotary electric machine, the following core is disclosed. The core is formed into an annular shape by connecting ends of a plurality of core pieces. Each core piece has a magnetic pole tooth protruding in a direction almost perpendicular to the connection direction and has a connection portion formed at any one end side of the ends. A first end surface on the one end side is formed into an arc shape about the connection portion, and a second end surface that can be fitted to the first end surface adjacent thereto is formed on the other end side. A first core member formed by arranging the core pieces via both end surfaces in a band shape, and a second core member formed by arranging the core pieces in a band shape so as to be staggered in the connection direction relative to the first core member, are stacked such that the ends adjacent to each other in the stacking direction of the core pieces overlap each other, and the connection portions are rotatably connected to each other so as to form the annular shape with the magnetic pole teeth directed inward (see, for example, Patent Document 1).

CITATION LIST

Patent Document

Patent Document 1: Japanese Laid-Open Patent Publication No. 2002-272027 (claims)

SUMMARY OF THE INVENTION

Problems to be Solved by the Invention

In the above conventional structure, the first end surface on one end side in each of the first core member and the second core member is formed into an arc shape about the connection portion, and the second end surface can be fitted to the first end surface adjacent thereto is formed on the other end side. Thus, since the first end surface and second end surface are formed into arc shapes, shape variation is likely to occur in manufacturing. In addition, the formation positions of the connection portions are also likely to vary.

Due to such variations in shapes and formation positions, when the core pieces adjacent in the circumferential direction are arranged in an annular shape about the respective connection portions, the angle formed by lines connecting the rotation shaft center and each center of the core pieces adjacent in the circumferential direction is not stable. Therefore, roundness of the laminated core for rotary electric machine is low. In addition, when the laminated cores for rotary electric machine are fixed in an annular shape, rigidity against external force become low.

The present disclosure has been made to solve the above problems, and an object of the present disclosure is to provide a laminated core for the rotary electric machine that is high in roundness and is high in rigidity against external force, and such a rotary electric machine.

Means of Solution to the Problems

A laminated core for a rotary electric machine according to the present disclosure includes a first core member including a plurality of first core pieces each having a back yoke and a magnetic pole tooth protruding inward in a radial direction from the back yoke, the back yoke having a projecting end which has a connection portion at one end in a first circumferential direction, and having a recessed end at another end in a second circumferential direction, the first core member being formed by arranging the plurality of first core pieces while fitting the projecting end of each first core piece and the recessed end of the adjacent first core piece. The laminated core includes a second core member including a plurality of second core pieces each having a back yoke and a magnetic pole tooth protruding inward in the radial direction from the back yoke, the back yoke having a projecting end which has a connection portion at one end in the second circumferential direction, and having a recessed end at another end in the first circumferential direction, the second core member being formed by arranging the plurality of second core pieces while fitting the projecting end of each second core piece and the recessed end of the adjacent second core piece. A member including the first core member and a member including the second core member are stacked while the projecting ends of the first core pieces and the projecting ends of the second core pieces are overlaid in an axial direction and connected rotatably by the connection portions. When the laminated core is formed in an annular shape, a radially inner part of a contact surface formed by the projecting end of the first core piece and the recessed end of the first core piece that are adjacent in a circumferential direction, and a radially inner part of a contact surface formed by the projecting end of the second core piece and the recessed end of the second core piece that are adjacent in the circumferential direction, are each positioned in a plane including a center axis of the annular stacked core.

A rotary electric machine according to the present disclosure includes the above laminated core for the rotary electric machine formed in an annular shape, windings wound around the magnetic pole teeth of the laminated core for the rotary electric machine and a rotor provided on a radially inner side of the laminated core for the rotary electric machine.

Effect of the Invention

According to a laminated core for a rotary electric machine and the rotary electric machine of the present disclosure, it is possible to provide the laminated core for the rotary electric machine that is high in roundness and high in rigidity against external force, and such a rotary electric machine.

EMBODIMENTS FOR CARRING OUT THE INVENTION

Before describing embodiments of the present disclosure, reference art as a premise for the present disclosure will be described to clarify the problem to be solved by the present disclosure, with reference to FIG. 19 to FIG. 23. In the description of the present disclosure, a circumferential direction X, a radial direction Y, and an axial direction Z respectively refer to a circumferential direction X, a radial direction Y, and an axial direction Z with respect to a rotary electric machine.

Reference Art

Figure 19:
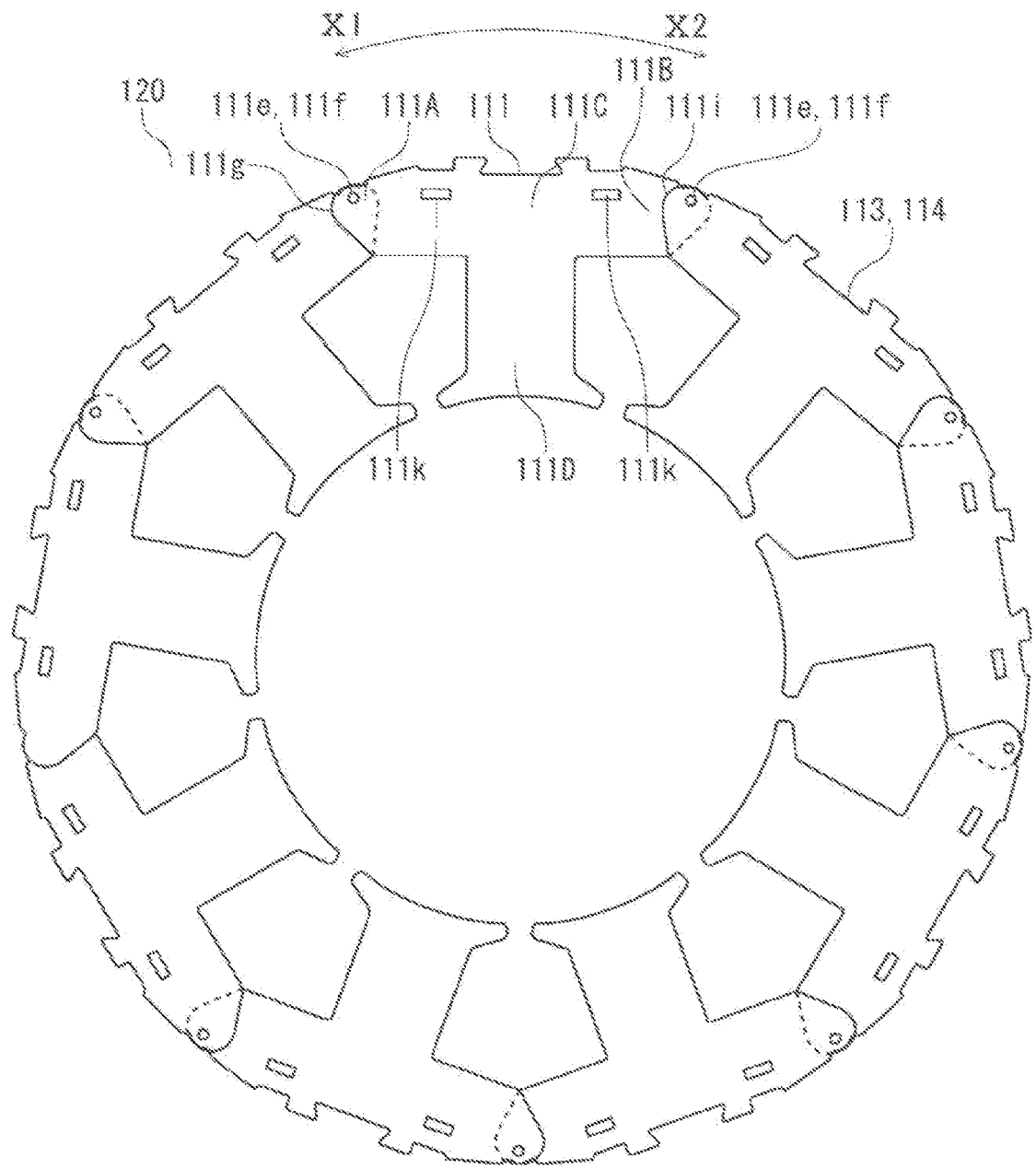
FIG. 19 is a front view showing the structure of a laminated core for a rotary electric machine in reference art for the present disclosure.
Figure 20:
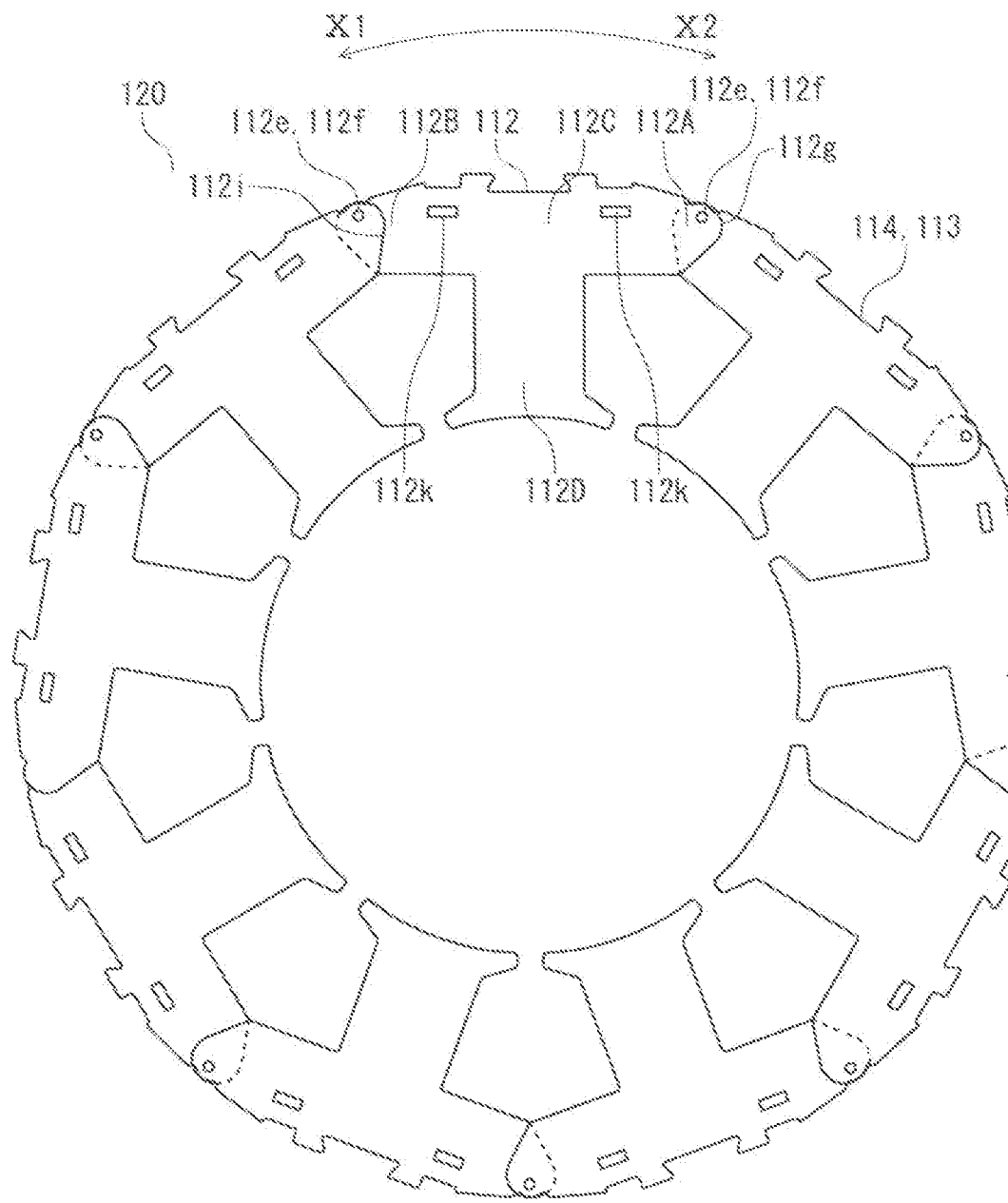
FIG. 20 is a front view showing the structure of the laminated core for the rotary electric machine in the reference art for the present disclosure.
Figure 21:
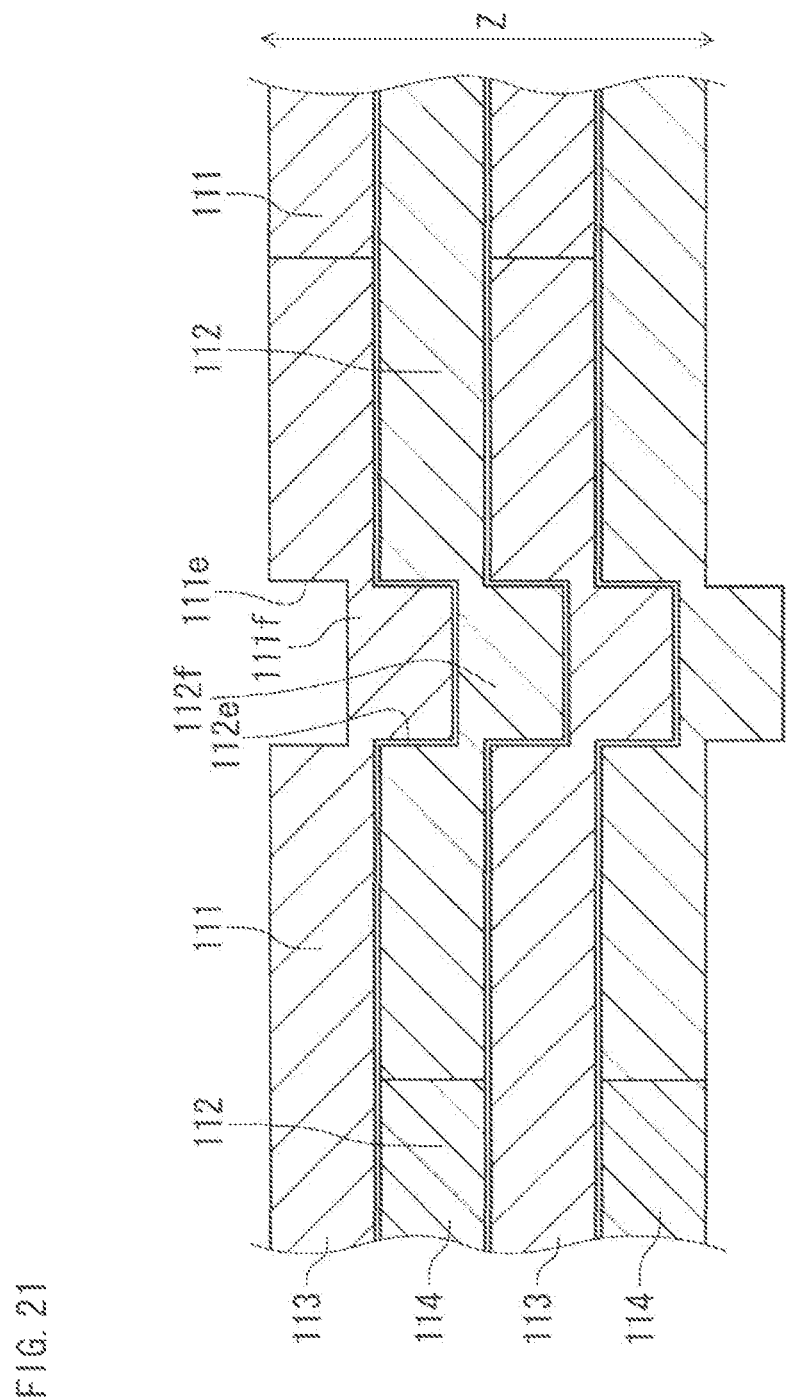
FIG. 21 is a partial sectional view showing the structure of connection portions of core members in the reference art for the present disclosure.
Figure 22:
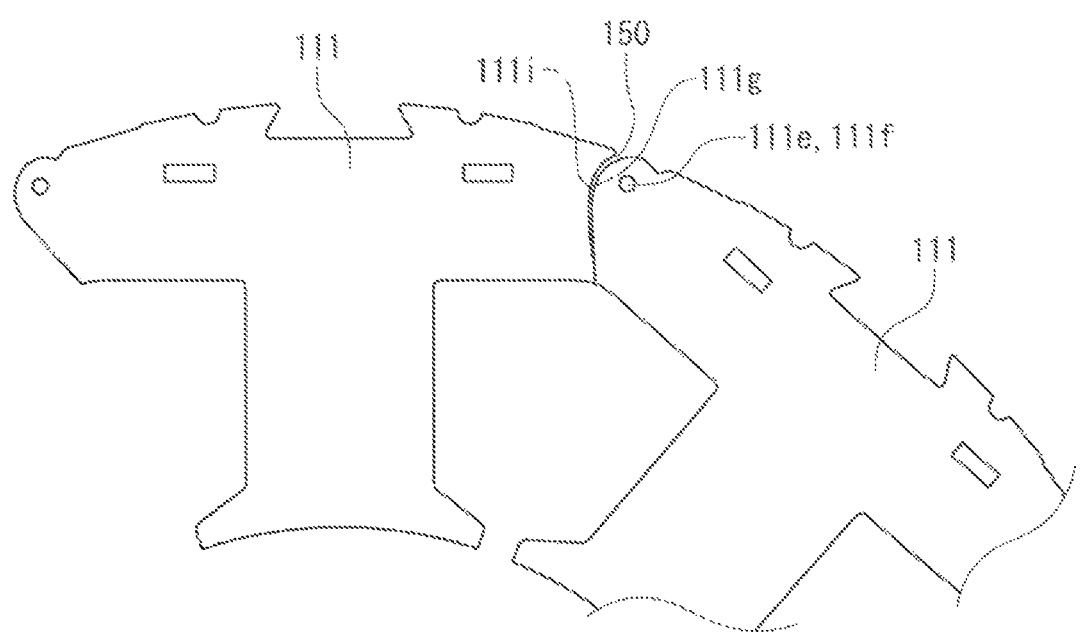
FIG. 22 is a partial detailed view illustrating disadvantage of the laminated core for the rotary electric machine in the reference art for the present disclosure.
Figure 23:
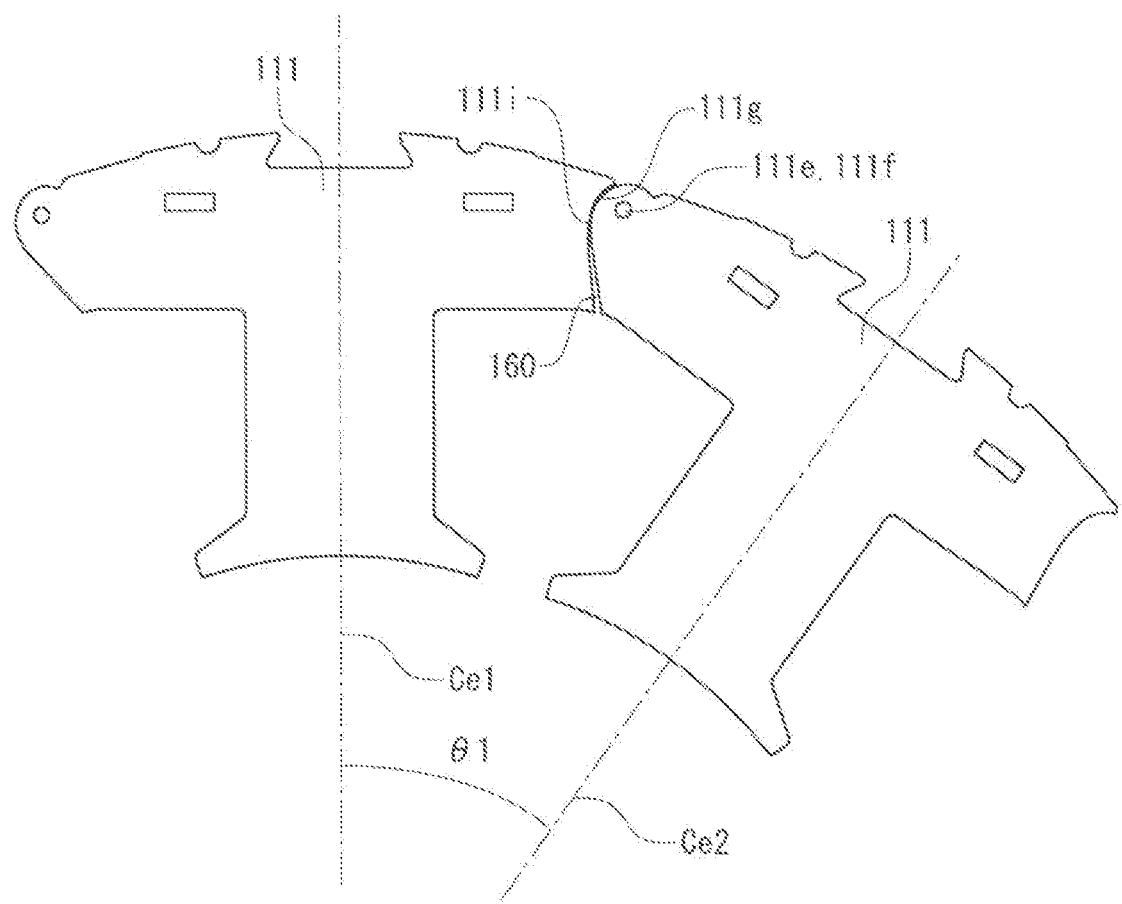
FIG. 23 is a partial detailed view illustrating disadvantage of the laminated core for the rotary electric machine in the reference art for the present disclosure.

FIG. 19 and FIG. 20 are front views showing the structure of a laminated core for a rotary electric machine in the reference art for the present disclosure, FIG. 21 is a partial sectional view showing the structure of connection portions of core members in the reference art for the present disclosure, and FIG. 22 and FIG. 23 are partial detailed views illustrating disadvantage of the laminated core for the rotary electric machine in the reference art for the present disclosure. It is noted that the core members collectively refer to a first core member and a second core member described below.

In FIG. 19, a first core member 113 is formed by arranging a plurality of first core pieces 111 in an annular shape while fitting a first end 111A and a second end 111B of the first core pieces 111 adjacent in the circumferential direction.

Each first core piece 111 is formed by a magnetic sheet such as an electromagnetic steel sheet, and each first core piece 111 has a back yoke 111C having a projecting first end 111A in a first circumferential direction X1 and a recessed second end 111B in a second circumferential direction X2, and having connection portions 111e, 111f at the first end 111A. And each first core piece 111 has a magnetic pole tooth 111D protruding inward in the radial direction from the back yoke 111C.

As shown in FIG. 20, a second core member 114 is formed by arranging a plurality of second core pieces 112 in an annular shape while fitting a first end 112A and a second end 112B of the second core pieces 112 adjacent in the circumferential direction, and they are arranged oppositely in the circumferential direction relative to the first core member 113 shown in FIG. 19.

Each second core piece 112 is formed by a magnetic sheet such as an electromagnetic steel sheet, and each second core piece 112 has a back yoke 112C having a projecting first end 112A in the second circumferential direction X2 and a recessed second end 112B in the first circumferential direction X1, and having connection portions 112e, 112f at the first end 112A. And each second core piece 112 has a magnetic pole tooth 112D protruding inward in the radial direction from the back yoke 112C.

A laminated core 120 for rotary electric machine in the reference art for the present disclosure is formed by alternately stacking the first core members 113 and the second core members 114 in the axial direction Z. As shown in the partial sectional view of the connection portions of the core members in FIG. 21, the connection portions 111e, 111f of each first core member 113 are the recess 111e formed on the front surface and the projection 111f formed on the back surface. The connection portions 112e, 112f of each second core member 114 are the recess 112e formed on the front surface and the projection 112f formed on the back surface. When the first core members 113 and the second core members 114 are stacked, the projection 111f which is the connection portion of the first core member 113 is fitted to the recess 112e which is the connection portion of the second core member 114, and the projection 112f which is the connection portion of the second core member 114 is fitted to the recess 111e which is the connection portion of the first core member 113. Thus, the connection portions 111e, 111f of the first core members 113 and the connection portions 112e, 112f of the second core members 114 can be connected rotatably about the connection portions.

As shown in FIG. 19, recess and projection portions 111k are formed on the front and back surfaces of the back yoke 111C of the first core piece 111, and as shown in FIG. 20, recess and projection portions 112k are formed on the front and back surfaces of the back yoke 112C of the second core piece 112. When the first core members 113 and the second core members 114 are stacked, the recess and projection portions 111k of each first core piece 111 and the recess and projection portions 112k of each second core piece 112 are fitted and connected to each other in the axial direction Z.

As shown in FIG. 19, the first end 111A of the first core piece 111 has a first end surface 111g having a projecting curved surface shape based on the connection portions 111e, 111f.

The second end 111B of the first core piece 111 has a third end surface 111i having a recessed curved surface shape based on the connection portions 111e, 111f of another first core piece 111 adjacent to each other in the circumferential direction.

The first end surface 111g having a projecting curved surface shape of the first core piece 111 is in contact with the third end surface 111i having a recessed curved surface shape of another first core piece 111 adjacent to each other in the circumferential direction.

As shown in FIG. 20, the first end 112A of the second core piece 112 has a first end surface 112g having a projecting curved surface shape based on the connection portions 112e, 112f.

The second end 112B of the second core piece 112 has a third end surface 112i having a recessed curved surface shape based on the connection portions 112e, 112f of another second core piece 112 adjacent to each other.

The first end surface 112g having a projecting curved surface shape of the second core piece 112 is in contact with the third end surface 112i having a recessed curved surface shape of another second core piece 112 adjacent to each other in the circumferential direction.

The laminated core for the rotary electric machine in the reference art for the present disclosure is configured as described above, so that the first core member 113 and the second core member 114 are arranged in an annular shape by being turned about the connection portions 111e, 111f of the first core pieces 111 and the connection portions 112e, 112f of the second core pieces 112, and the first end surface 111g of each first core piece 111 is in contact with the third end surface 111i of another first core piece 111 adjacent to each other in the circumferential direction. Further and the first end surface 112g of each second core piece 112 is in contact with the third end surface 112i of another second core piece 112 adjacent to each other in the circumferential direction.

However, since the first end surface 111g of the first core piece 111 and the first end surface 112g of the second core piece 112 have projecting curved surface shapes, and the third end surface 111i of the first core piece 111 and the third end surface 112i of the second core piece 112 have recessed curved surface shapes, shape variation is likely to occur in manufacturing. In addition, the formation positions of the recess and projection portions at the connection portions 111e, 111f, 112e, 112f are also likely to vary.

Due to such variations in shapes and formation positions, when the first core pieces 111 and the second core pieces 112 adjacent in the circumferential direction are turned about the connection portions so as to form an annular shape, variation occurs in the contact states of the recess and projection portions 111e, 111f, 112e, 112f at the connection portions. As a result, as shown in FIG. 22, a gap 150 is formed on the radially outer side between the first core pieces 111 adjacent in the circumferential direction, or as shown in FIG. 23, a gap 160 is formed on the radially inner side between the first core pieces 111 adjacent in the circumferential direction.

Therefore, an angle θ1 formed by lines Ce1 and Ce2 connecting the rotation shaft center and each center of the first core pieces 111 adjacent in the circumferential direction is not stable, so that roundness of the laminated core 120 for the rotary electric machine is deteriorated. In addition, when the laminated core 120 for the rotary electric machine is fixed in an annular shape, since the gaps 150, 160 are generated as described above, rigidity against external force becomes low.

The embodiments of the present disclosure have been made to solve the problems of the above reference art. Hereinafter, the embodiments of the present disclosure will be described in detail with reference to the drawings.

Embodiment 1

Figure 1:
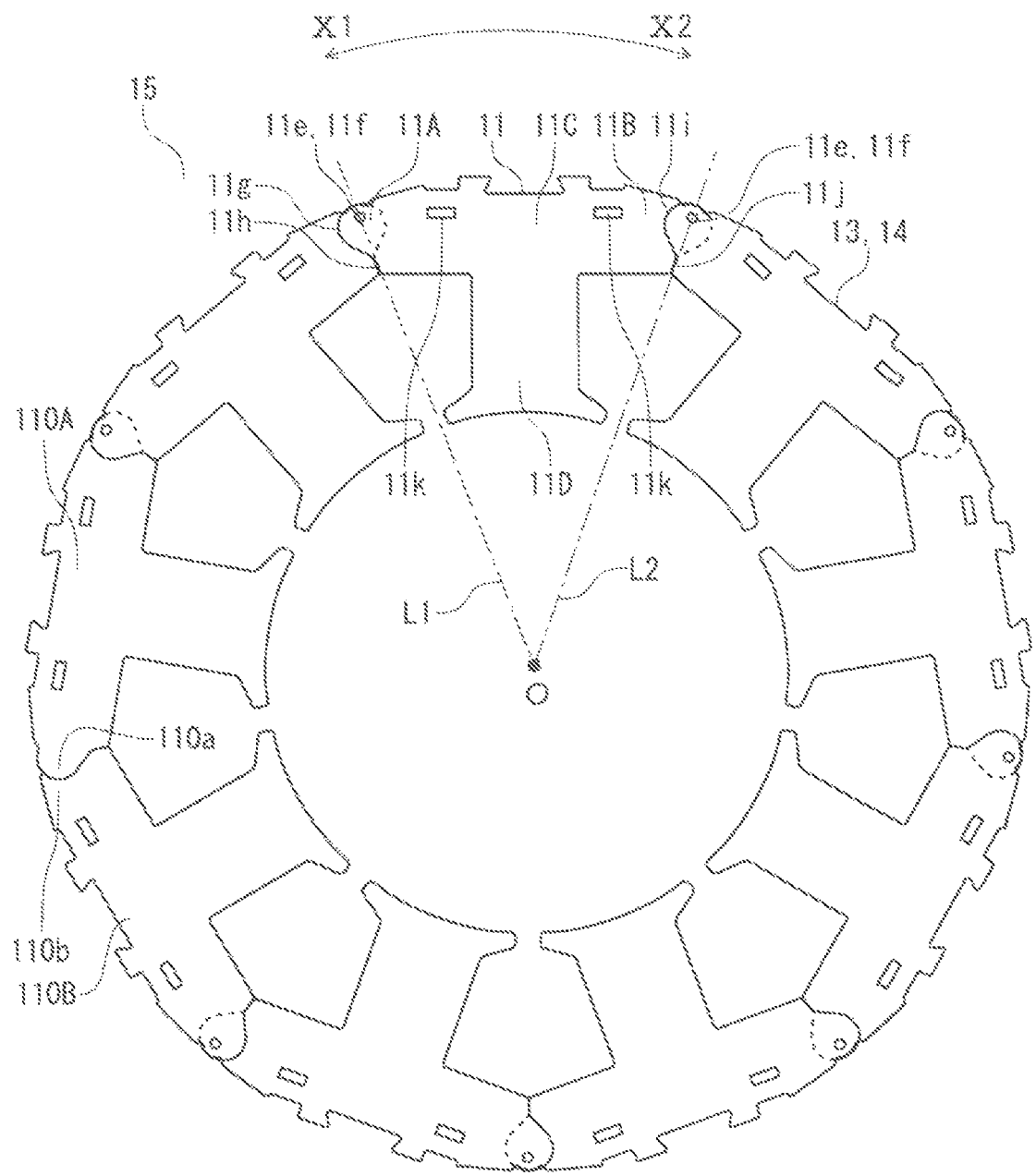
FIG. 1 is a front view showing the structure of a laminated core for a rotary electric machine according to embodiment 1.
Figure 2:
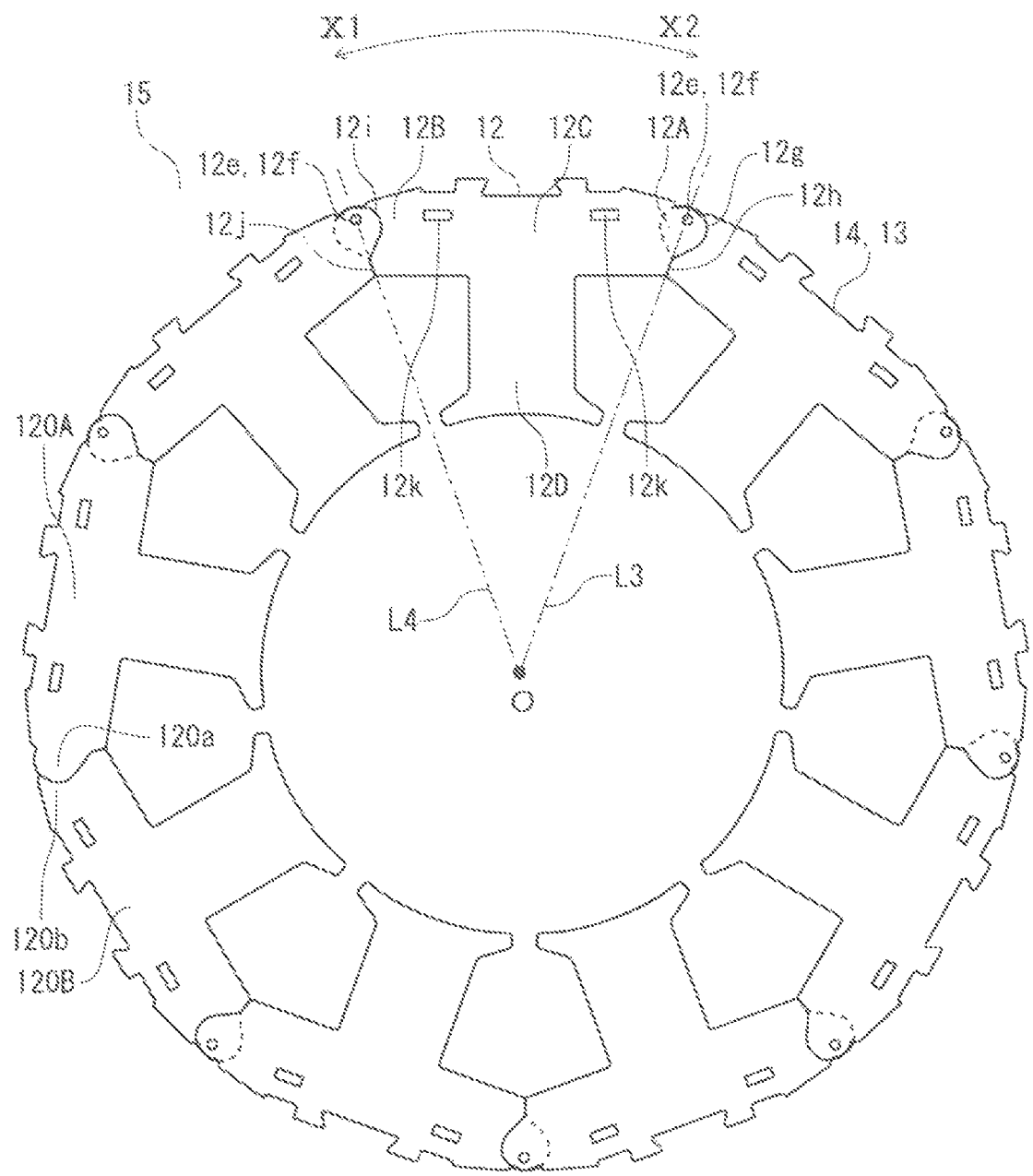
FIG. 2 is a front view showing the structure of the laminated core for the rotary electric machine according to embodiment 1.
Figure 3:
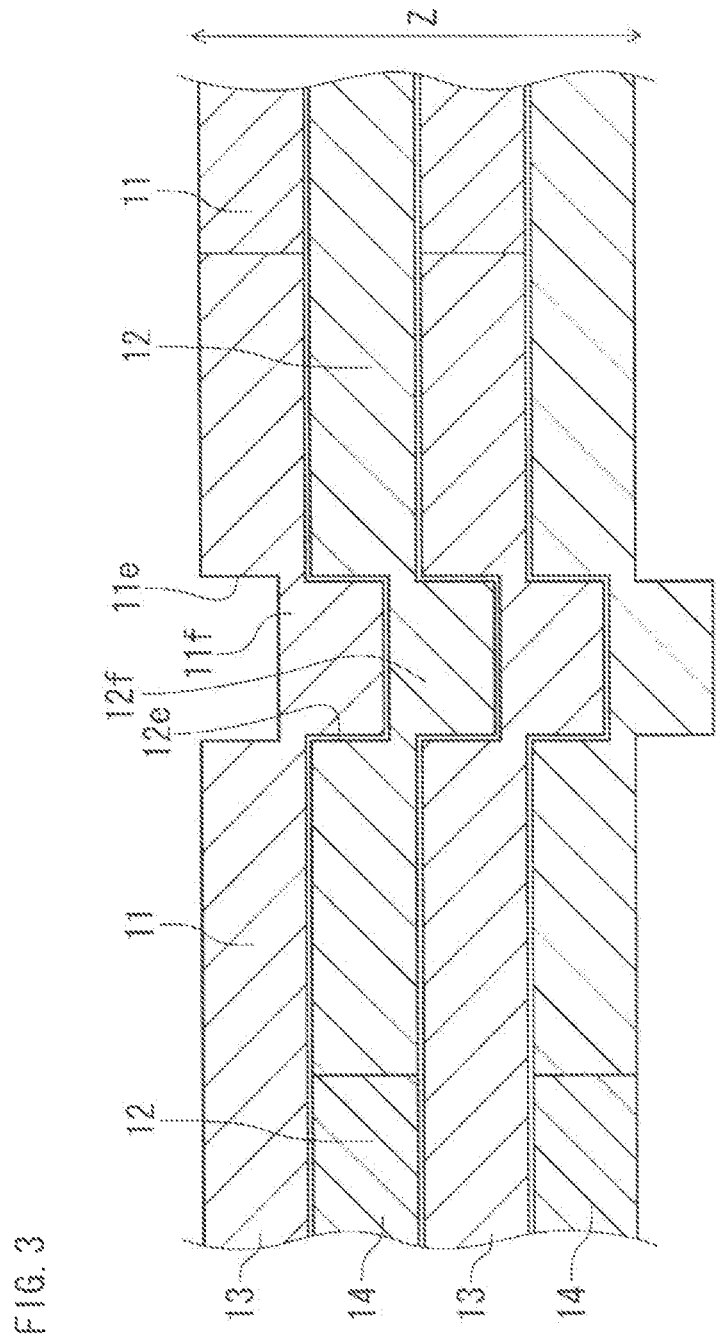
FIG. 3 is a partial sectional view showing the structure of connection portions of core members according to embodiment 1.
Figure 4:
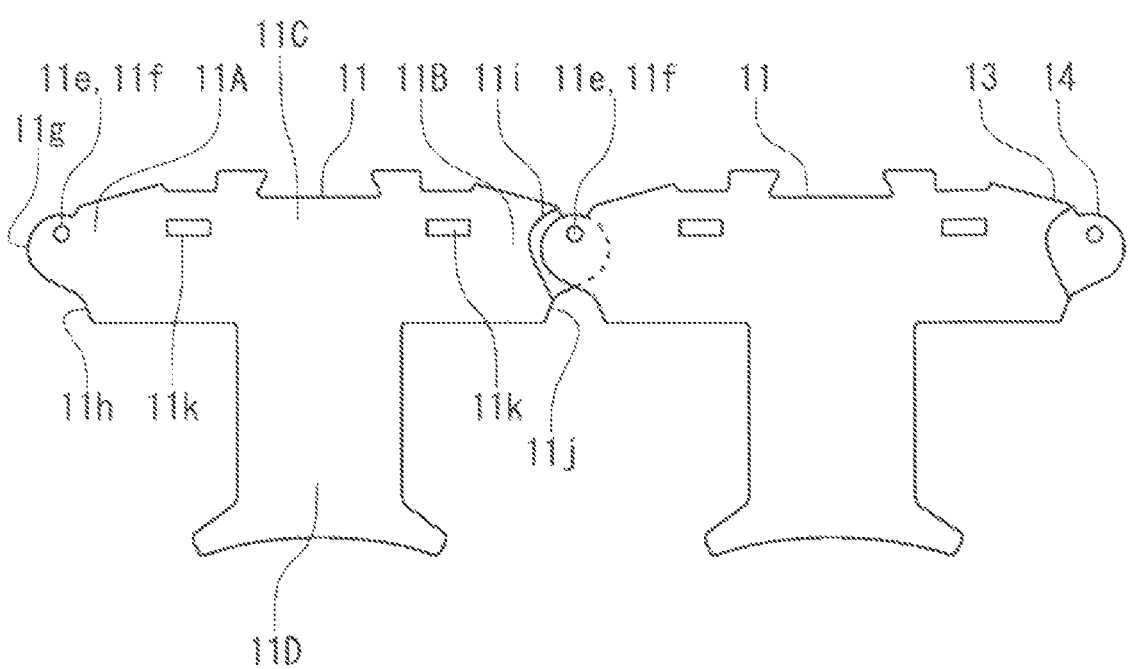
FIG. 4 is a plane view showing a part of a structure in which the core members are arranged in a straight shape, according to embodiment 1.
Figure 5:
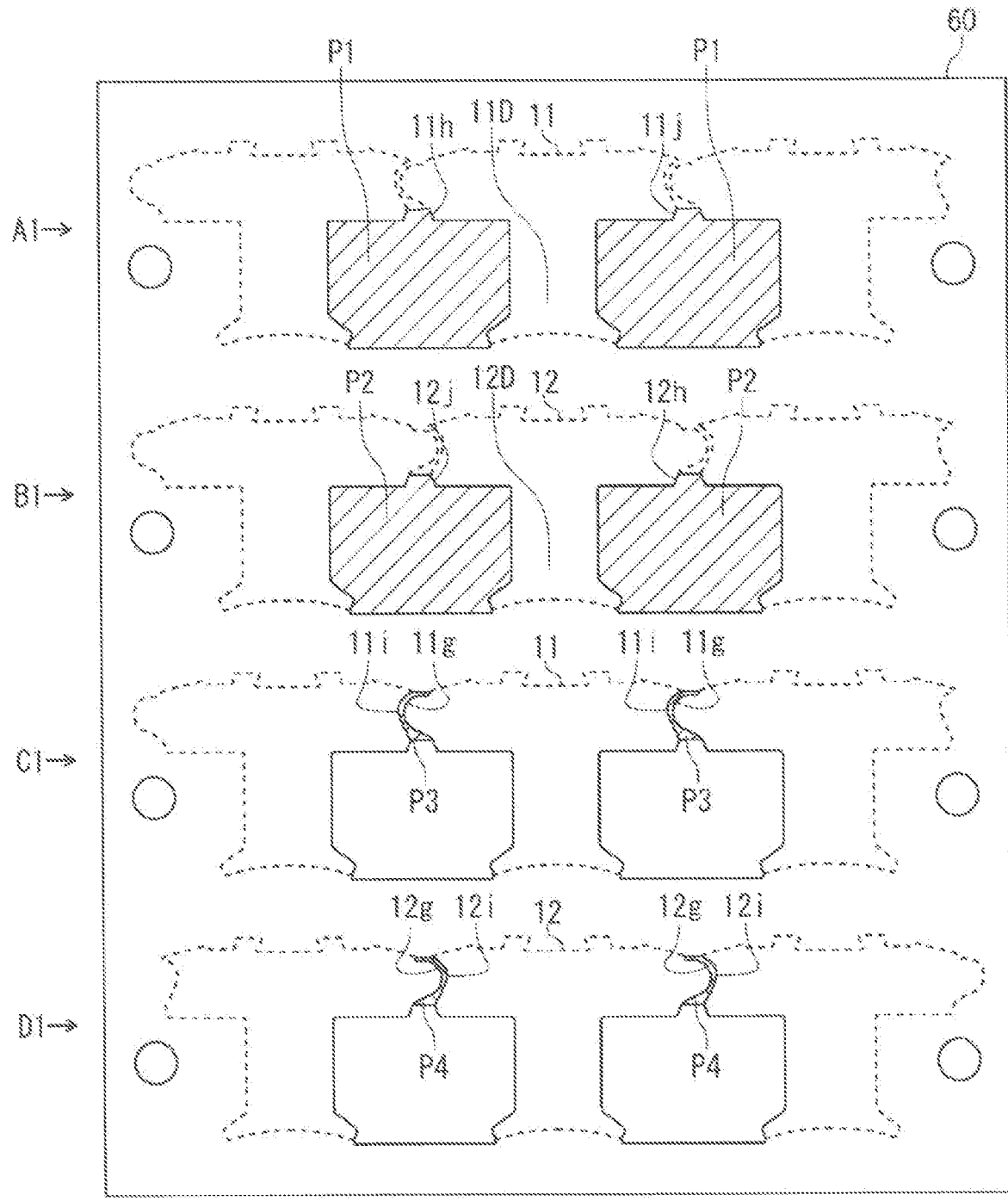
FIG. 5 is a plane view showing a process for forming a part of the core member by press punching, according to embodiment 1.
Figure 6:
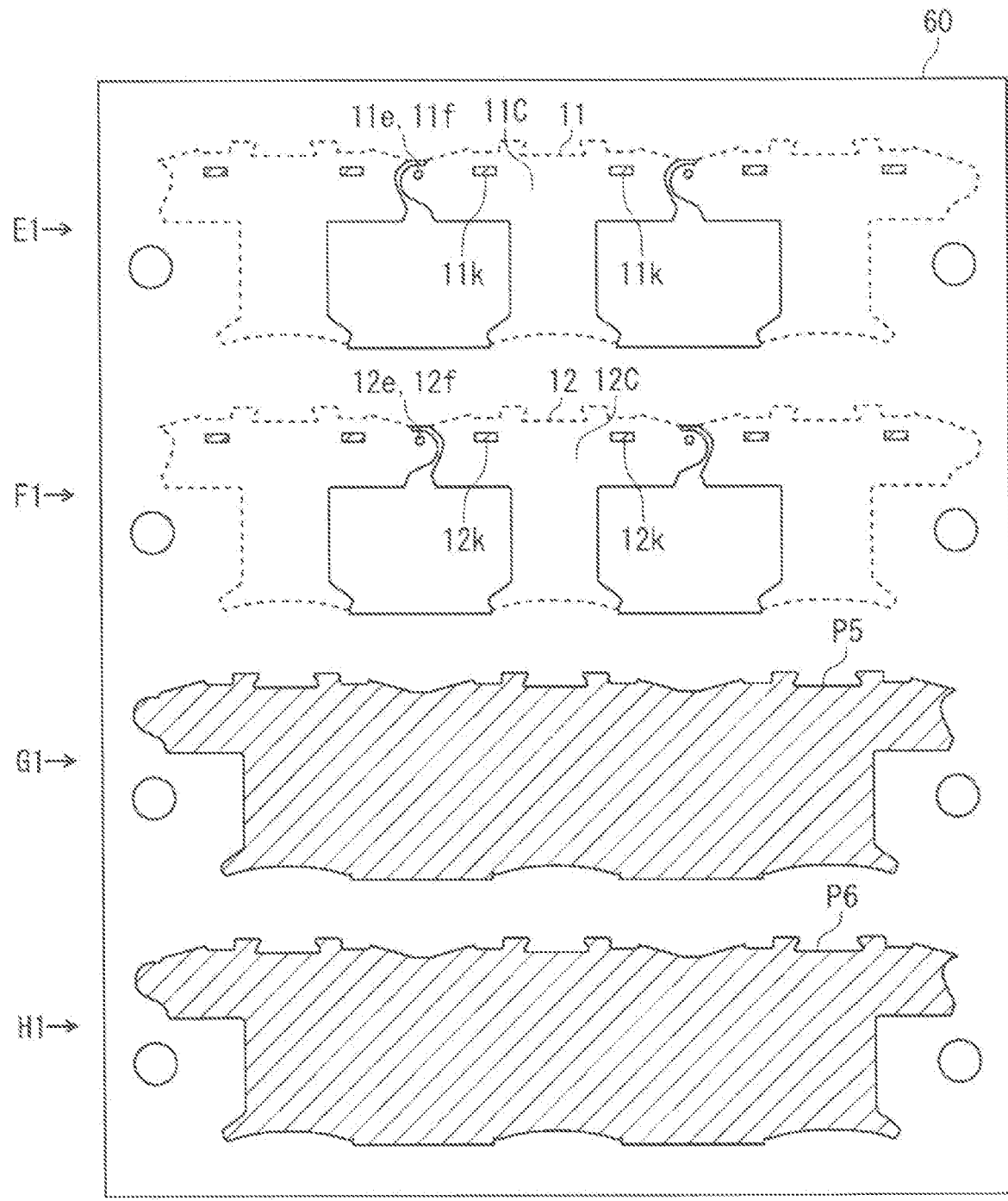
FIG. 6 is a plane view showing the process for forming a part of the core member by press punching, according to embodiment 1.
Figure 7:
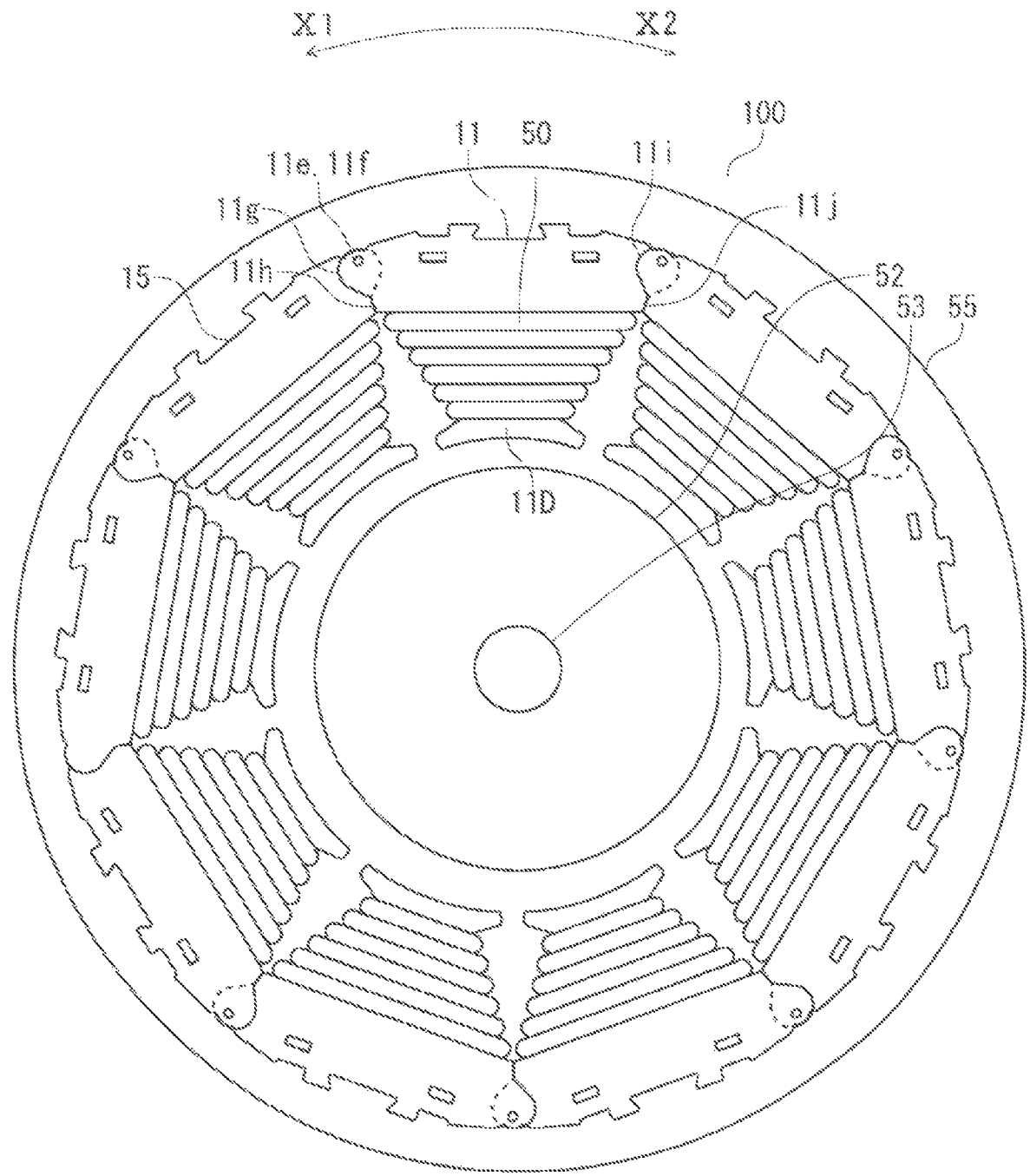
FIG. 7 is a front view showing the structure of the rotary electric machine according to embodiment 1.

FIG. 1 and FIG. 2 are front views showing the structure of a laminated core for a rotary electric machine according to embodiment 1, FIG. 3 is a partial sectional view showing the structure of connection portions of core members according to embodiment 1, FIG. 4 is a plane view showing a part of a structure in which the core members are arranged in a straight shape according to embodiment 1, FIG. 5 and FIG. 6 are plane views showing a process for forming a part of the core member by press punching according to embodiment 1, and FIG. 7 is a front view showing the structure of the rotary electric machine according to embodiment 1.

FIG. 1 is a front view of a laminated core 15 for the rotary electric machine according to embodiment 1, and shows the state in which the laminated core 15 is seen from the upper side in the axial direction when the first core member 13 formed by arranging a plurality of first core pieces 11 in an annular shape is set at the top.

As shown in FIG. 1, the first core piece 11 is formed from a magnetic sheet such as an electromagnetic steel sheet, and has a back yoke 11C having a projecting end 11A (hereinafter, referred to as first end 11A) at one end in the first circumferential direction X1 and a recessed end 11B (hereinafter, referred to as second end 11B) at one end in the second circumferential direction X2 opposite to the first circumferential direction, and having connection portions 11e, 11f at the first end 11A. And the first core piece 11 has a magnetic pole tooth 11D protruding inward in the radial direction from the back yoke 11C.

The first core member 13 is formed by arranging a plurality of the first core pieces 11 while fitting the first end 11A and the second end 11B of the first core pieces 11 adjacent in the circumferential direction.

FIG. 2 is a front view of the laminated core 15 for the rotary electric machine according to embodiment 1, and shows the state in which the laminated core 15 is seen from the upper side in the axial direction when the second core member 14 formed by arranging a plurality of second core pieces 12 in an annular shape is set at the top.

As shown in FIG. 2, the second core piece 12 is formed from a magnetic sheet such as an electromagnetic steel sheet, and has: a back yoke 12C having a projecting end 12A (hereinafter, referred to as first end 12A) at one end in the second circumferential direction X2 and a recessed end 12B (hereinafter, referred to as second end 12B) at one end in the first circumferential direction X1, and having connection portions 12e, 12f at the first end 12A. And the second core piece 12 has a magnetic pole tooth 12D protruding inward in the radial direction from the back yoke 12C.

The second core member 14 is formed by arranging a plurality of the second core pieces 12 while fitting the first end 12A and the second end 12B of the second core pieces 12 adjacent in the circumferential direction, and they are arranged oppositely in the circumferential direction relative to the first core member 13.

The laminated core 15 for the rotary electric machine according to the present embodiment is formed by alternately stacking the first core members 13 and the second core members 14 in the axial direction Z. As shown in the partial sectional view of the connection portions of the core members in FIG. 3, the connection portions 11e, 11f of each first core member 13 are the recess 11e formed on the front surface and the projection 11f formed on the back surface. The connection portions 12e, 12f of each second core member 14 are the recess 12e formed on the front surface and the projection 12f formed on the back surface. When the first core members 13 and the second core members 14 are stacked, the projection 11f which is the connection portion of the first core member 13 is fitted to the recess 12e which is the connection portion of the second core member 14, and the projection 12f which is the connection portion of the second core member 14 is fitted to the recess 11e which is the connection portion of the first core member 13. Thus, the connection portions 11e, 11f of the first core members 13 and the connection portions 12e, 12f of the second core members 14 can be rotatably connected about the connection portions.

As shown in FIG. 1, core pieces 110A and 110B having abutting portions 110a and 110b having no connection portions 11e, 11f at ends in the circumferential direction of the back yokes 11C are provided adjacently to the first core pieces 11 of the first core member 13. In addition, as shown in FIG. 2, core pieces 120A and 120B having abutting portions 120a and 120b having no connection portions 12e, 12f at ends in the circumferential direction of the back yokes 12C are provided adjacently to the second core pieces 12 of the second core member 14. In the present embodiment, the shapes of the abutting portions 110a and 120a and the shapes of the abutting portions 110b and 120b are the same, and the contact surfaces of the abutting portions are flush with each other along the stacking direction. The projecting portions and the recessed portions of the abutting portions may be alternately arranged among the stacked layers. The abutting portions may be formed in straight shapes, instead of recess and projection shapes. The abutting portions are finally fixed to each other by means of welding, joining, or the like so that the laminated core 15 is formed in an annular shape.

FIG. 4 is a plane view showing a part of a structure in which the first core member 13 and the second core member 14 are arranged in a straight shape by turning the connection portions 11e, 11f of the first core member 13 and the connection portions 12e, 12f of the second core member 14 about the connection portions.

As shown in FIG. 1, recess and projection portions 11k are formed on the front and back surfaces of the back yoke 11C of each first core piece 11, and as shown in FIG. 2, recess and projection portions 12k are formed on the front and back surfaces of the back yoke 12C of each second core piece 12. When the first core members 13 and the second core members 14 are stacked, the recess and projection portions 11k of each first core piece 11 and the recess and projection portions 12k of each second core piece 12 are fitted and connected to each other in the axial direction Z.

Returning to FIG. 1, the first end 11A of the first core piece 11 has a first end surface 11g formed at a radially outer position and having a projecting curved surface shape based on the connection portions 11e, 11f. And the first end 11A has a flat-shaped second end surface 11h formed at a radially inner position and present on a line L1 connecting the axial center of the connection portions 11e, 11f and an axial center O of the rotary electric machine.

The second end 11B of the first core piece 11 has a third end surface 11i formed at a radially outer position and having a recessed curved surface shape based on the connection portions 11e, 11f of another first core piece 11 adjacent to each other. And the second end 11B has a flat-shaped fourth end surface 11j formed at a radially inner position and present on a line L2 connecting the axial center of the connection portions 11e, 11f and the axial center O of the rotary electric machine.

The first end surface 11g having a projecting curved surface shape of the first core piece 11 is in contact with the third end surface 11i having a recessed curved surface shape of another first core piece 11 adjacent to each other. And the flat-shaped second end surface 11h of the first core piece 11 is in contact with the flat-shaped fourth end surface 11j of another first core piece 11 adjacent to each other.

Returning to FIG. 2, the first end 12A of the second core piece 12 has a first end surface 12g formed at a radially outer position and having a projecting curved surface shape based on the connection portions 12e, 12f. And the first end 12A has a flat-shaped second end surface 12h formed at a radially inner position and present on a line L3 connecting the axial center of the connection portions 12e, 12f and the axial center O of the rotary electric machine.

The second end 12B of the second core piece 12 has a third end surface 12i formed at a radially outer position and having a recessed curved surface shape based on the connection portions 12e, 12f of another second core piece 12 adjacent to each other. And the second end 12B has a flat-shaped fourth end surface 12j formed at a radially inner position and present on a line L4 connecting the axial center of the connection portions 12e, 12f and the axial center O of the rotary electric machine.

The first end surface 12g having a projecting curved surface shape of the second core piece 12 is in contact with the third end surface 12i having a recessed curved surface shape of another second core piece 12 adjacent to each other. And the flat-shaped second end surface 12h of the second core piece 12 is in contact with the flat-shaped fourth end surface 12j of another second core piece 12 adjacent to each other.

In the present embodiment, as shown in FIG. 1 and FIG. 2, the line L1 and the line L4 passing the axial center O of the rotary electric machine are located so as to overlap each other in the axial direction of the rotary electric machine, and the line L2 and the line L3 passing the axial center O of the rotary electric machine are located so as to overlap each other in the axial direction of the rotary electric machine. However, the line L1 and the line L4 passing the axial center O of the rotary electric machine may be located so as not to overlap each other in the axial direction of the rotary electric machine, or the line L2 and the line L3 passing the axial center O of the rotary electric machine may be located so as not to overlap each other in the axial direction of the rotary electric machine.

That is, when the laminated core 15 is formed in an annular shape, a radially inner part of the contact surface formed by the projecting first end 11A of the first core piece 11 and the recessed second end 11B of the first core piece 11 that are adjacent in the circumferential direction, and a radially inner part of the contact surface formed by the projecting first end 12A of the second core piece 12 and the recessed second end 12B of the second core piece 12 that are adjacent in the circumferential direction, are respectively positioned in a plane including the center axis of the annular laminated core 15 and the center axis of the connection portions 11e, 11f, 12e, 12f.

It is noted that the above plane including the center axis of the annular laminated core 15 may not necessarily include the center axis of the connection portions 11e, 11f, 12e, 12f.

Also at the above abutting portions, it is preferable that a radially inner part of the contact surface formed by the projecting abutting portion 110a of the core piece 110A and the recessed abutting portion 110b of the core piece 110B that are adjacent in the circumferential direction, and a radially inner part of the contact surface formed by the projecting abutting portion 120a of the core piece 120A and the recessed abutting portion 120b of the core piece 120B that are adjacent in the circumferential direction, are respectively positioned in a plane including the center axis of the annular laminated core 15.

Next, a method for manufacturing the laminated core 15 for the rotary electric machine according to embodiment 1 configured as described above will be described with reference to FIG. 5 and FIG. 6. FIG. 5 and FIG. 6 show the case of manufacturing three of the first core pieces 11 for the first core member 13 and three of the second core pieces 12 for the second core member 14, and in particular, manufacture of the first core piece 11 and the second core piece 12 at the center position is mainly illustrated.

First, at a position indicated by arrow A1 in FIG. 5, as a first stage for working the first core member 13, parts P1 indicated by hatching in the drawing are punched by a press in order to form a peripheral part of the magnetic pole tooth 11D, the second end surface 11h, and the fourth end surface 11j of the first core piece 11.

Then, at a position indicated by arrow B1 in FIG. 5, as a first stage for working the second core member 14, parts P2 indicated by hatching in the drawing are punched by a press in order to form a peripheral part of the magnetic pole tooth 12D, the second end surface 12h, and the fourth end surface 12j of the second core piece 12.

Next, at a position indicated by arrow C1 in FIG. 5, as a second stage for working the first core member 13, parts P3 indicated by hatching in the drawing are punched by a press in order to form the first end surface 11g and the third end surface 11i of the first core piece 11.

Then, at a position indicated by arrow D1 in FIG. 5, as a second stage for working the second core member 14, parts P4 indicated by hatching in the drawing are punched by a press in order to form the first end surface 12g and the third end surface 12i of the second core piece 12.

Next, at a position indicated by arrow E1 in FIG. 6, as a third stage for working the first core member 13, the recess 11e and the projection 11f fittable as the connection portions are formed on the back and front surfaces of the first end 11A of the first core piece 11 by press punching, and the fittable recess and projection portions 11k are formed on the back and front surfaces of the back yoke 11C of the first core piece 11 by press punching.

Then, at a position indicated by arrow F1 in FIG. 6, as a third stage for working the second core member 14, the recess 12e and the projection 12f fittable as the connection portions are formed on the back and front surfaces of the first end 12A of the second core piece 12 by press punching, and the fittable recess and projection portions 12k are formed on the back and front surfaces of the back yoke 12C of the second core piece 12 by press punching.

Next, at a position indicated by arrow G1 in FIG. 6, as a fourth stage for working the first core member 13, a part P5 indicated by hatching in the drawing is punched by a press in order to form the first core member 13.

Then, at a position indicated by arrow H1 in FIG. 6, as a fourth stage for working the second core member 14, a part P6 indicated by hatching in the drawing is punched by a press in order to form the second core member 14.

Then, the first core members 13 and the second core members 14 formed as described above are sequentially stacked in a mold, the recess and projection portions 11e, 11f and the recess and projection portions 12e, 12f opposed to each other in the stacking direction of the first core pieces 11 of the first core members 13 and the second core pieces 12 of the second core members 14 are fitted to each other, and the recess and projection portions 11k and the recess and projection portions 12k opposed to each other in the stacking direction are fitted to each other. Whereby the first core members 13 and the second core members 14 are integrated in the stacking direction.

Next, by being turned using the fitted recess and projection portions 11e, 11f and the fitted recess and projection portions 12e, 12f as pivots of the connection portions, the first core members 13 and the second core members 14 are reversely warped outward in the radial direction.

Then, windings 50 are wound around the magnetic pole teeth 11D of the first core pieces 11 and the magnetic pole teeth 12D of the second core pieces 12. Then, by being turned using the recess and projection portions 11e, 11f and the recess and projection portions 12e, 12f as pivots of the connection portions, the laminated core 15 for the rotary electric machine formed in an annular shape and provided with the windings 50 is formed.

Finally, as shown in FIG. 7, a frame 55 is provided on the radially outer side of the laminated core 15 for the rotary electric machine provided with the windings 50, and a rotor 52 having a rotation shaft 53 is provided on the radially inner side, whereby the rotary electric machine 100 is formed.

As described above, according to the present embodiment, when the laminated core is formed in an annular shape, a radially inner part of the contact surface formed by the projecting end of the first core piece and the recessed end of the first core piece that are adjacent in the circumferential direction, and a radially inner part of the contact surface formed by the projecting end of the second core piece and the recessed end of the second core piece that are adjacent in the circumferential direction, are respectively positioned in a plane including the center axis of the annular laminated core. Therefore, forces arising between the first core pieces adjacent in the circumferential direction and forces arising between the second core pieces adjacent in the circumferential direction, are equal between right and left and act only in the circumferential direction. Thus, rigidity against external force is enhanced, and roundness of the laminated core for the rotary electric machine is increased.

In the above description, an example in which the first core members and the second core members are alternately stacked in the axial direction Z in order to form the laminated core for the rotary electric machine, has been described. However, a stacked body obtained by stacking a plurality of first core members and a stacked body obtained by stacking a plurality of second core members may be stacked in order to form the laminated core for the rotary electric machine.

Embodiment 2

Figure 8:
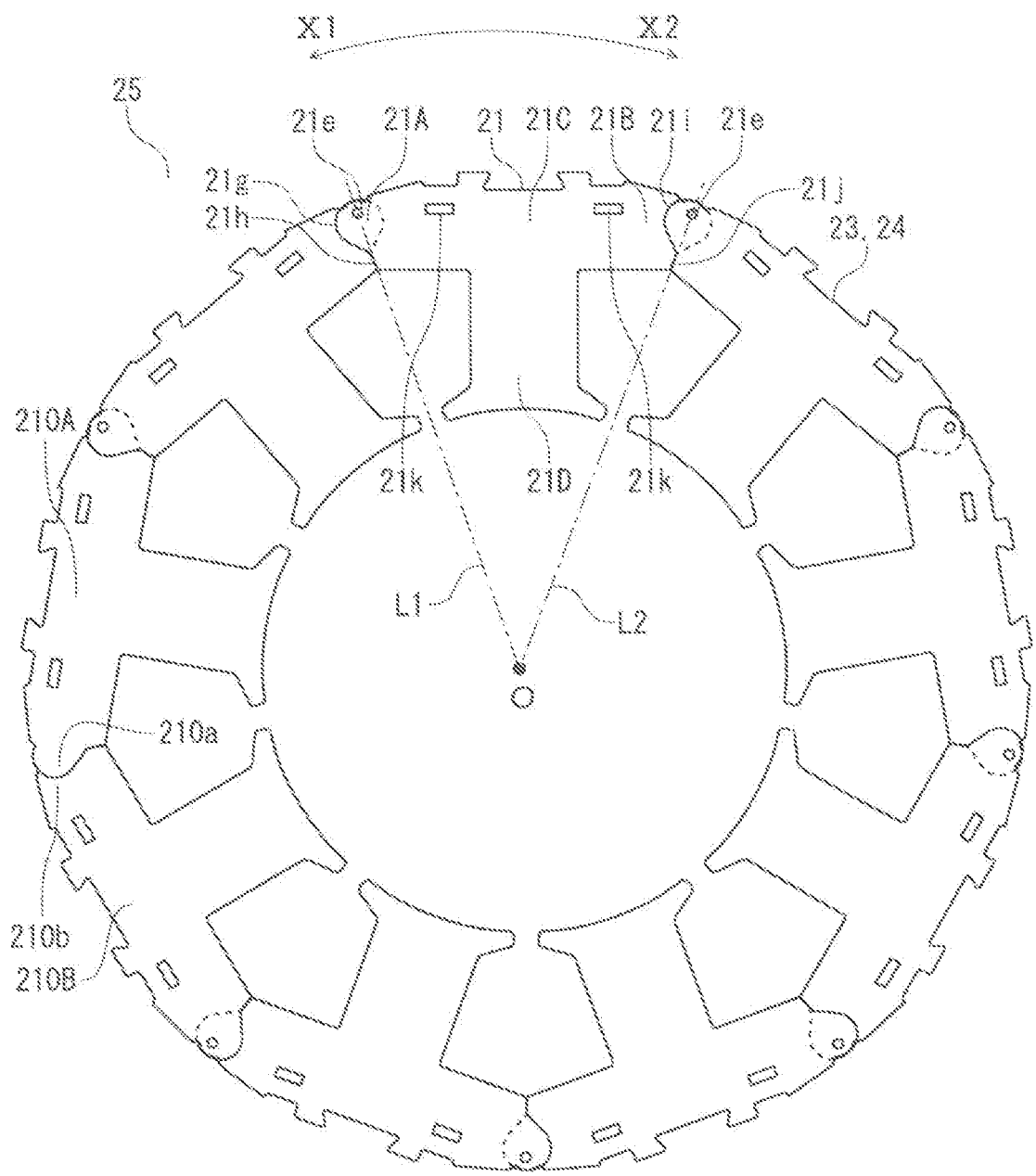
FIG. 8 is a front view showing the structure of a laminated core for a rotary electric machine according to embodiment 2.
Figure 9:
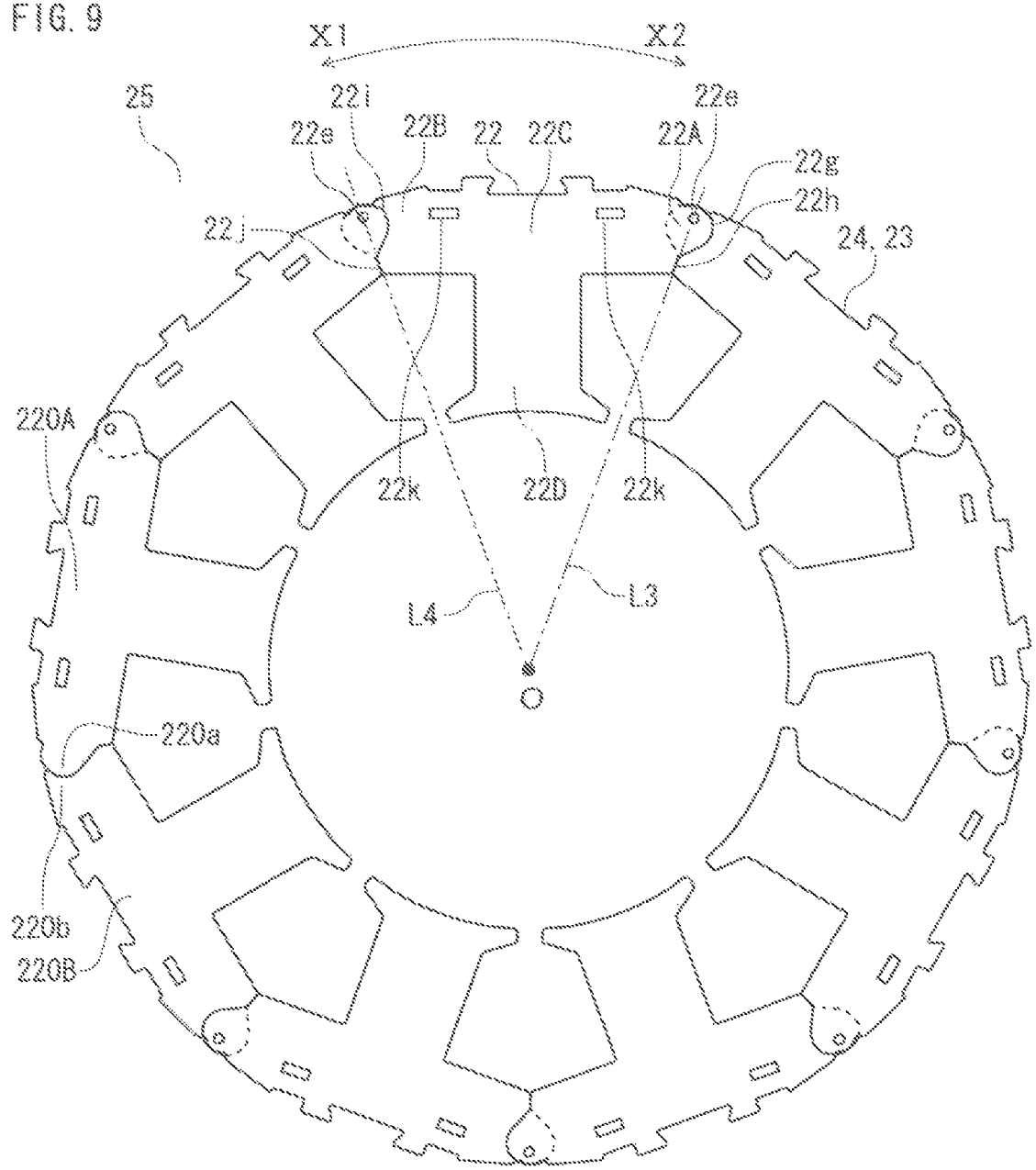
FIG. 9 is a front view showing the structure of the laminated core for the rotary electric machine according to embodiment 2.
Figure 10:
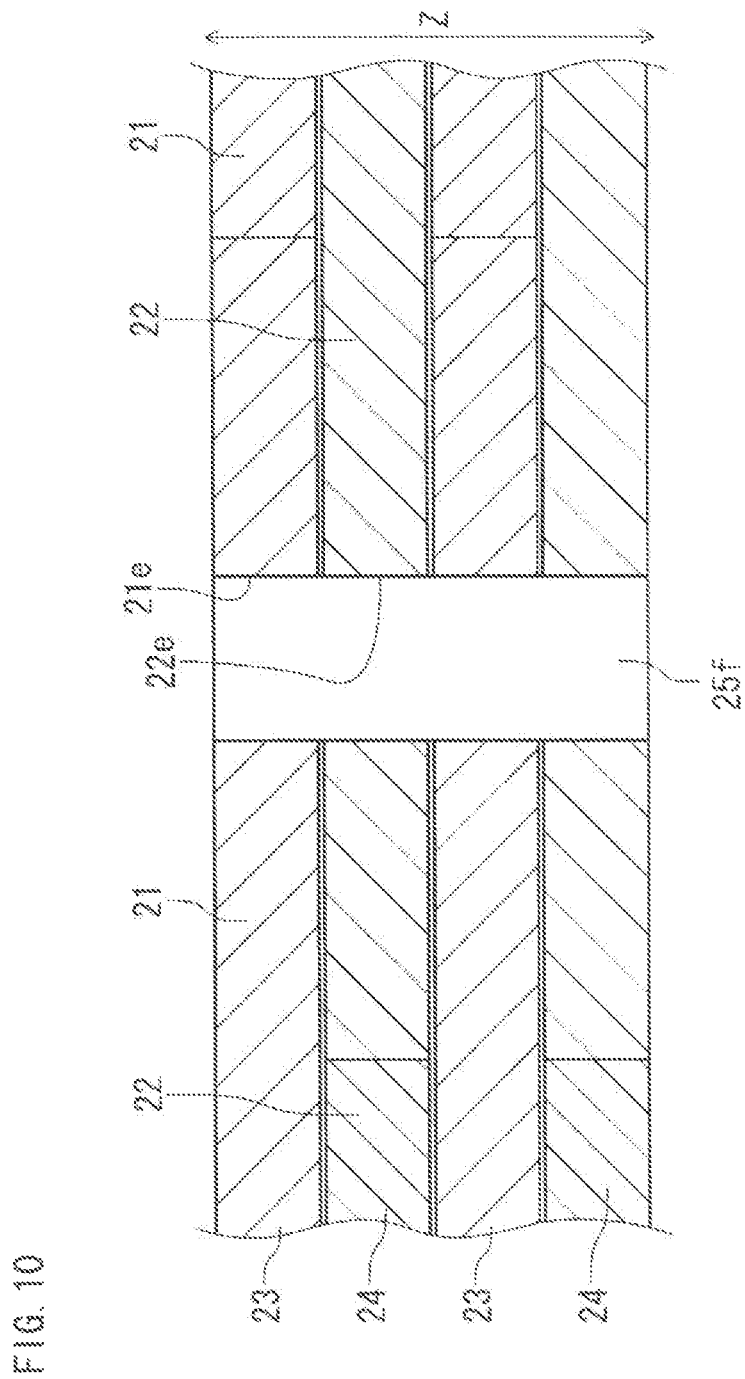
FIG. 10 is a partial sectional view showing the structure of connection portions of core members according to embodiment 2.
Figure 11:
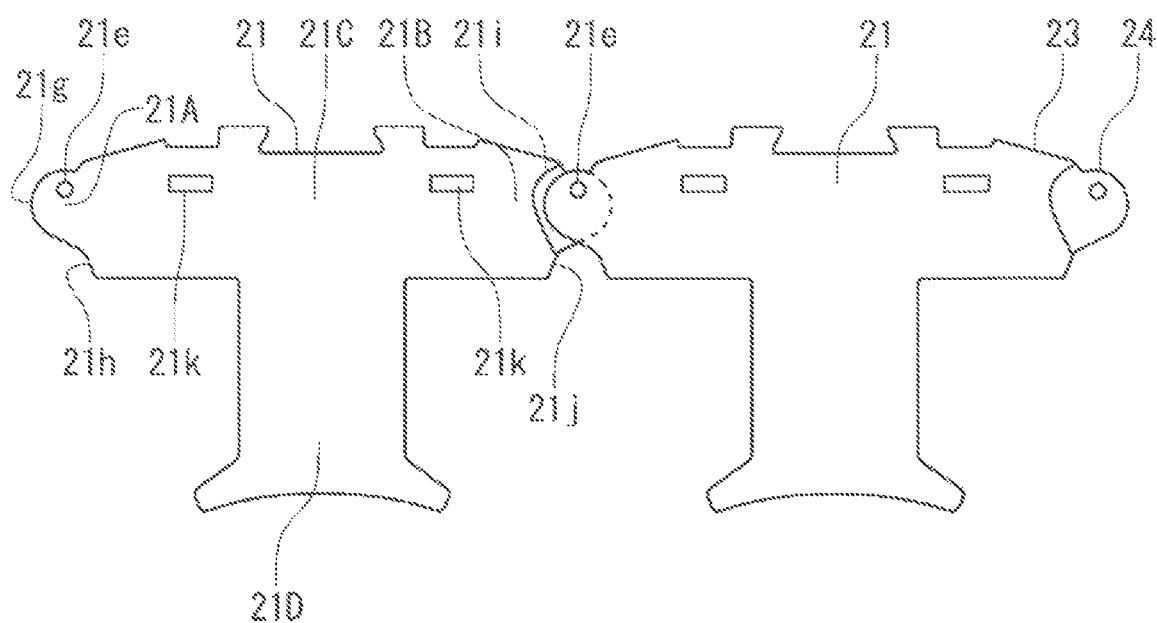
FIG. 11 is a plane view showing a part of a structure in which the core members are arranged in a straight shape, according to embodiment 2.
Figure 12:
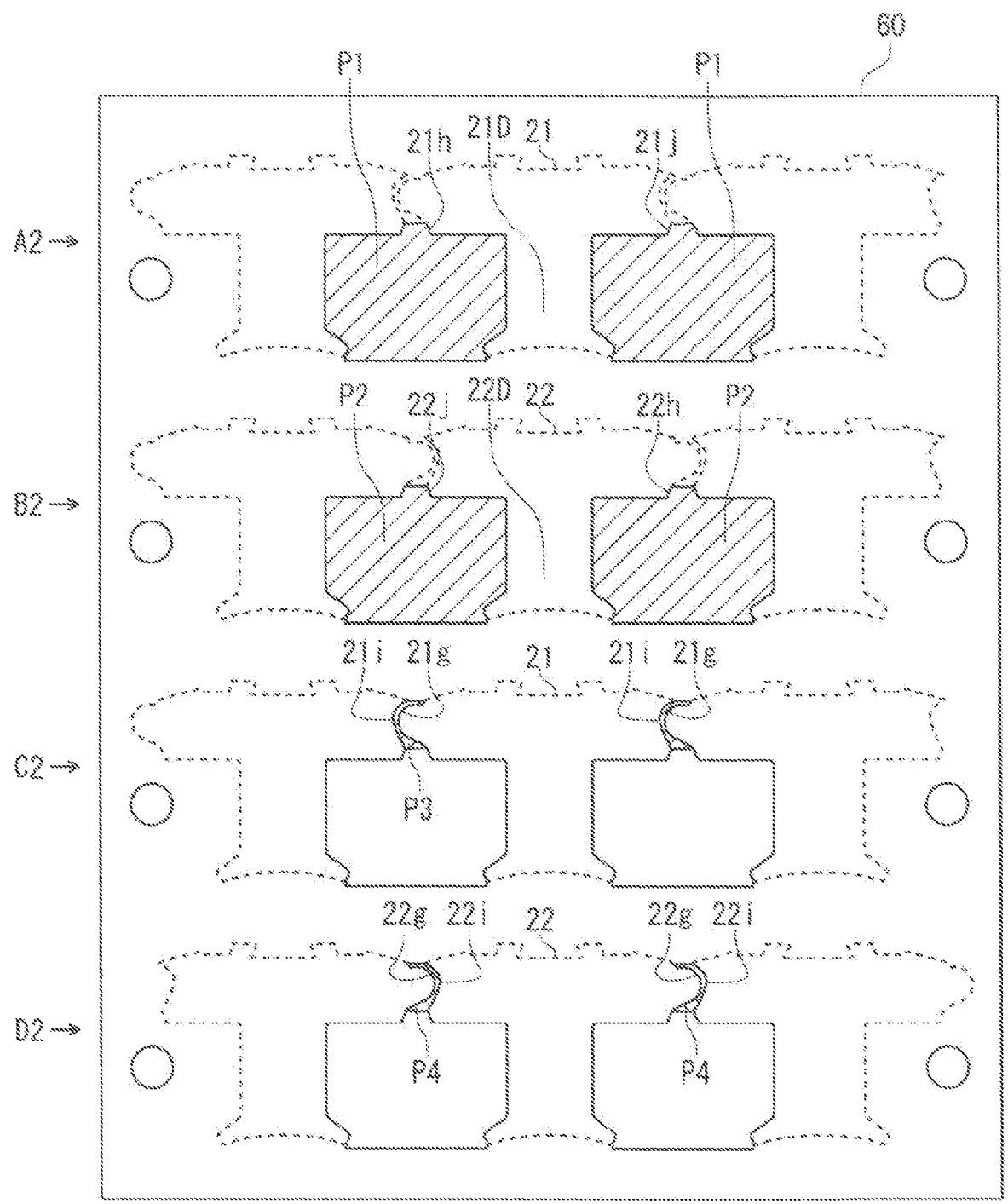
FIG. 12 is a plane view showing a process for forming a part of the core member by press punching, according to embodiment 2.
Figure 13:
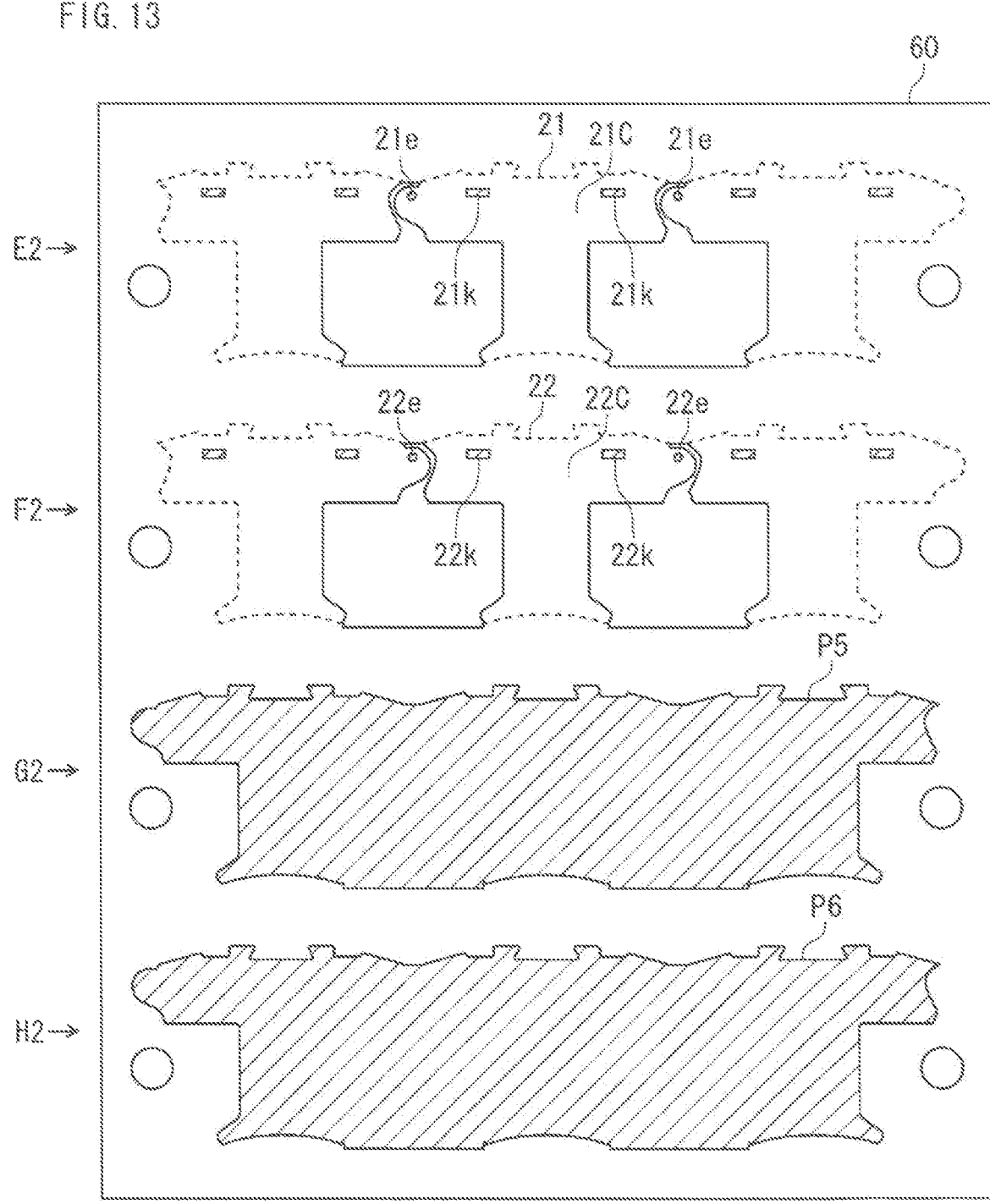
FIG. 13 is a plane view showing the process for forming a part of the core member by press punching, according to embodiment 2.

FIG. 8 and FIG. 9 are front views showing the structure of a laminated core for a rotary electric machine according to embodiment 2, FIG. 10 is a partial sectional view showing the structure of connection portions of core members according to embodiment 2, FIG. 11 is a plane view showing a part of a structure in which the core members are arranged in a straight shape according to embodiment 2, and FIG. 12 and FIG. 13 are plane views showing a process for forming a part of the core member by press punching according to embodiment 2.

FIG. 8 is a front view of a laminated core 25 for the rotary electric machine according to embodiment 2, and shows the state in which the laminated core 25 is seen from the upper side in the axial direction when a first core member 23 formed by arranging a plurality of first core pieces 21 in an annular shape is set at the top.

As shown in FIG. 8, the first core piece 21 is formed from a magnetic sheet such as an electromagnetic steel sheet, and has a back yoke 21C having a projecting end 21A (hereinafter, referred to as first end 21A) at one end in the first circumferential direction X1 and a recessed end 21B (hereinafter, referred to as second end 21B) at one end in the second circumferential direction X2 opposite to the first circumferential direction, and having a through hole 21e as a connection portion at the first end 21A. And the first core piece 21 has a magnetic pole tooth 21D protruding inward in the radial direction from the back yoke 21C.

The first core member 23 is formed by arranging a plurality of the first core pieces 21 in an annular shape while fitting the first end 21A and the second end 21B of the first core pieces 21 adjacent in the circumferential direction.

FIG. 9 is a front view of the laminated core 25 for the rotary electric machine according to embodiment 2, and shows the state in which the laminated core 25 is seen from the upper side in the axial direction when a second core member 24 formed by arranging a plurality of second core pieces 22 in an annular shape is set at the top.

As shown in FIG. 9, the second core piece 22 is formed from a magnetic sheet such as an electromagnetic steel sheet, and has a back yoke 22C having a projecting end 22A (hereinafter, referred to as first end 22A) at one end in the second circumferential direction X2 and a recessed end 22B (hereinafter, referred to as second end 22B) at one end in the first circumferential direction X1, and having a through hole 22e as a connection portion at the first end 22A. And the second core piece 22 has a magnetic pole tooth 22D protruding inward in the radial direction from the back yoke 22C.

The second core member 24 is formed by arranging a plurality of the second core pieces 22 in an annular shape while fitting the first end 22A and the second end 22B of the second core pieces 22 adjacent in the circumferential direction, and they are arranged oppositely in the circumferential direction relative to the first core member 23.

The laminated core 25 for the rotary electric machine according to the present embodiment is formed by alternately stacking the first core members 23 and the second core members 24 in the axial direction Z. As shown in the partial sectional view of the connection portions of the core members in FIG. 10, a connection shaft 25f such as a pin is press-fitted into the through holes 21e of the first core members 23 and the through holes 22e of the second core members 24. Whereby the first core members 23 and the second core members 24 are connected to each other in the axial direction Z by the connection portions 21e, 22e, 25f, and the first core members 23 and the second core members 24 can be turned about the connection portions.

As shown in FIG. 8, core pieces 210A and 210B having abutting portions 210a and 210b having no connection portions 21e at ends in the circumferential direction of the back yokes 21C are provided adjacently to the first core pieces 21 of the first core member 23. In addition, as shown in FIG. 9, core pieces 220A and 220B having abutting portions 220a and 220b having no connection portions 22e at ends in the circumferential direction of the back yokes 22C are provided adjacently to the second core pieces 22 of the second core member 24. In the present embodiment, the shapes of the abutting portions 210a and 220a and the shapes of the abutting portions 210b and 220b are the same, and the contact surfaces of the abutting portions are flush with each other along the stacking direction. The projecting portions and the recessed portions of the abutting portions may be alternately arranged among the stacked layers. The abutting portion may be formed in straight shapes, instead of recess and projection shapes. The abutting portions are finally fixed to each other by means of welding, joining, or the like so that the laminated core 25 is formed in an annular shape.

FIG. 11 is a plane view showing a part of a structure in which the first core member 23 and the second core member 24 are arranged in a straight shape by turning the first core member 23 and the second core member 24 about the connection portions 21e, 22e, 25f.

As shown in FIG. 8, recess and projection portions 21k are formed on the front and back surfaces of the back yoke 21C of each first core piece 21, and as shown in FIG. 9, recess and projection portions 22k are formed on the front and back surfaces of the back yoke 22C of each second core piece 22. When the first core members 23 and the second core members 24 are stacked, the recess and projection portions 21k of each first core piece 21 and the recess and projection portions 22k of each second core piece 22 are fitted and connected to each other in the axial direction Z.

Returning to FIG. 8, the first end 21A of the first core piece 21 has a first end surface 21g formed at a radially outer position and having a projecting curved surface shape based on the connection portion 21e. And the first end 21A has a flat-shaped second end surface 21h formed at a radially inner position and present on a line L1 connecting the axial center of the connection portion 21e and the axial center O of the rotary electric machine.

The second end 21B of the first core piece 21 has a third end surface 21l formed at a radially outer position and having a recessed curved surface shape based on the connection portion 21e of another first core piece 21 adjacent to each other. And the second end 21B has a flat-shaped fourth end surface 21*j* formed at a radially inner position and present on a line L2 connecting the axial center of the connection portion 21*e* and the axial center O of the rotary electric machine.

The first end surface 21*g* having a projecting curved surface shape of the first core piece 21 is in contact with the third end surface 21*i* having a recessed curved surface shape of another first core piece 21 adjacent to each other. And the flat-shaped second end surface 21*h* of the first core piece 21 is in contact with the flat-shaped fourth end surface 21*j* of another first core piece 21 adjacent to each other.

Returning to FIG. 9, the first end 22A of the second core piece 22 has a first end surface 22*g* formed at a radially outer position and having a projecting curved surface shape based on the connection portion 22*e*. And the first end 22A has a flat-shaped second end surface 22*h* formed at a radially inner position and present on a line L3 connecting the axial center of the connection portion 22*e* and the axial center O of the rotary electric machine.

The second end 22B of the second core piece 22 has a third end surface 22*i* formed at a radially outer position and having a recessed curved surface shape based on the connection portion 22*e* of another second core piece 22 adjacent to each other. And the second end 22B has a flat-shaped fourth end surface 22*j* formed at a radially inner position and present on a line L4 connecting the axial center of the connection portion 22*e* and the axial center O of the rotary electric machine.

The first end surface 22*g* having a projecting curved surface shape of the second core piece 22 is in contact with the third end surface 22*i* having a recessed curved surface shape of another second core piece 22 adjacent to each other. And the flat-shaped second end surface 22*h* of the second core piece 22 is in contact with the flat-shaped fourth end surface 22*j* of another second core piece 22 adjacent to each other.

In the present embodiment, as shown in FIG. 8 and FIG. 9, the line L1 and the line L4 passing the axial center O of the rotary electric machine are located so as to overlap each other in the axial direction of the rotary electric machine, and the line L2 and the line L3 passing the axial center O of the rotary electric machine are located so as to overlap each other in the axial direction of the rotary electric machine. However, the line L1 and the line L4 passing the axial center O of the rotary electric machine may be located so as not to overlap each other in the axial direction of the rotary electric machine, or the line L2 and the line L3 passing the axial center O of the rotary electric machine may be located so as not to overlap each other in the axial direction of the rotary electric machine.

That is, when the laminated core 25 is formed in an annular shape, a radially inner part of the contact surface formed by the projecting first end 21A of the first core piece 21 and the recessed second end 21B of the first core piece 21 that are adjacent in the circumferential direction, and a radially inner part of the contact surface formed by the projecting first end 22A of the second core piece 22 and the recessed second end 22B of the second core piece 22 that are adjacent in the circumferential direction, are respectively positioned in a plane including the center axis of the annular laminated core 25 and the center axis of the connection portions 21*e*, 22*e*.

It is noted that the above plane including the center axis of the annular laminated core 25 may not necessarily include the center axis of the connection portions 21*e*, 22*e*.

Also at the above abutting portions, it is preferable that a radially inner part of the contact surface formed by the projecting abutting portion 210*a* of the core piece 210A and the recessed abutting portion 210*b* of the core piece 210B that are adjacent in the circumferential direction, and a radially inner part of the contact surface formed by the projecting abutting portion 220*a* of the core piece 220A and the recessed abutting portion 220*b* of the core piece 220B that are adjacent in the circumferential direction, are respectively positioned in a plane including the center axis of the annular laminated core 25.

Next, a method for manufacturing the laminated core 25 for the rotary electric machine according to embodiment 2 configured as described above will be described with reference to FIG. 12 and FIG. 13. FIG. 12 and FIG. 13 show the case of manufacturing three of the first core pieces 21 for the first core member 23 and three of the second core pieces 22 for the second core member 24, and in particular, manufacture of the first core piece 21 and the second core piece 22 at the center position is mainly illustrated.

First, at a position indicated by arrow A2 in FIG. 12, as a first stage for working the first core member 23, parts P1 indicated by hatching in the drawing are punched by a press in order to form a peripheral part of the magnetic pole tooth 21D, the second end surface 21*h*, and the fourth end surface 21*j* of the first core piece 21.

Then, at a position indicated by arrow B2 in FIG. 12, as a first stage for working the second core member 24, parts P2 indicated by hatching in the drawing are punched by a press in order to form a peripheral part of the magnetic pole tooth 22D, the second end surface 22*h*, and the fourth end surface 22*j* of the second core piece 22.

Next, at a position indicated by arrow C2 in FIG. 12, as a second stage for working the first core member 23, parts P3 indicated by hatching in the drawing are punched by a press in order to form the first end surface 21*g* and the third end surface 21*i* of the first core piece 21.

Then, at a position indicated by arrow D2 in FIG. 12, as a second stage for working the second core member 24, parts P4 indicated by hatching in the drawing are punched by a press in order to form the first end surface 22*g* and the third end surface 22*i* of the second core piece 22.

Next, at a position indicated by arrow E2 in FIG. 13, as a third stage for working the first core member 23, the through hole 21*e* as the connection portion is formed in the first end 21A of the first core piece 21 by press punching, and the fittable recess and projection portions 21*k* are formed on the back and front surfaces of the back yoke 21C of the first core piece 21 by press punching.

Then, at a position indicated by arrow F2 in FIG. 13, as a third stage for working the second core member 24, the through hole 22*e* as the connection portion is formed in the back and front surfaces of the first end 22A of the second core piece 22 by press punching, and the fittable recess and projection portions 22*k* are formed on the back and front surfaces of the back yoke 22C of the second core piece 22 by press punching.

Next, at a position indicated by arrow G2 in FIG. 13, as a fourth stage for working the first core member 23, a part P5 indicated by hatching in the drawing is punched by a press in order to form the first core member 23.

Then, at a position indicated by arrow H2 in FIG. 13, as a fourth stage for working the second core member 24, a part P6 indicated by hatching in the drawing is punched by a press in order to form the second core member 24.

Then, the first core members 23 and the second core members 24 formed as described above are sequentially stacked in a mold, and the recess and projection portions 21k and the recess and projection portions 22k opposed to each other in the stacking direction of the first core pieces 21 of the first core member 23 and the second core pieces 22 of the second core members 24 are fitted to each other. Whereby the first core members 23 and the second core members 24 are integrated in the stacking direction.

Next, the connection shafts 25f such as pins are press-fitted into the through holes 21e of the first core members 23 and the through holes 22e of the second core members 24.

Then, by turning the first core members 23 and the second core members 24 about the connection shafts 25f, the first core members 13 and the second core members 14 are reversely warped outward in the radial direction.

Next, windings (not shown) are wound around the magnetic pole teeth 21D of the first core pieces 21 and the magnetic pole teeth 22D of the second core pieces 22. Then, by being turned about the connection shafts 25f, the laminated core 25 for the rotary electric machine formed in an annular shape and provided with the windings is formed. Finally, a frame is provided on the radially outer side of the laminated core 25 for the rotary electric machine provided with the windings, and a rotor having a rotation shaft is provided on the radially inner side, whereby the rotary electric machine is formed.

As described above, according to the present embodiment, when the laminated core is formed in an annular shape, a radially inner part of the contact surface formed by the projecting end of the first core piece and the recessed end of the first core piece that are adjacent in the circumferential direction, and a radially inner part of the contact surface formed by the projecting end of the second core piece and the recessed end of the second core piece that are adjacent in the circumferential direction, are respectively positioned in a plane including the center axis of the annular laminated core. Therefore, forces arising between the first core pieces adjacent in the circumferential direction and forces arising between the second core pieces adjacent in the circumferential direction, are equal between right and left and act only in the circumferential direction. Thus, rigidity against external force is enhanced, and roundness of the laminated core for the rotary electric machine is increased.

In the above description, an example in which the first core members and the second core members are alternately stacked in the axial direction Z in order to form the laminated core for the rotary electric machine, has been described. However, a stacked body obtained by stacking a plurality of first core members and a stacked body obtained by stacking a plurality of second core members may be stacked in order to form the laminated core for the rotary electric machine.

Embodiment 3

Hereinafter, a laminated core for a rotary electric machine according to embodiment 3 will be described. Here, the characteristic part of embodiment 3 will be mainly described, and description of the same parts as in the above embodiments is omitted appropriately.

Figure 14:
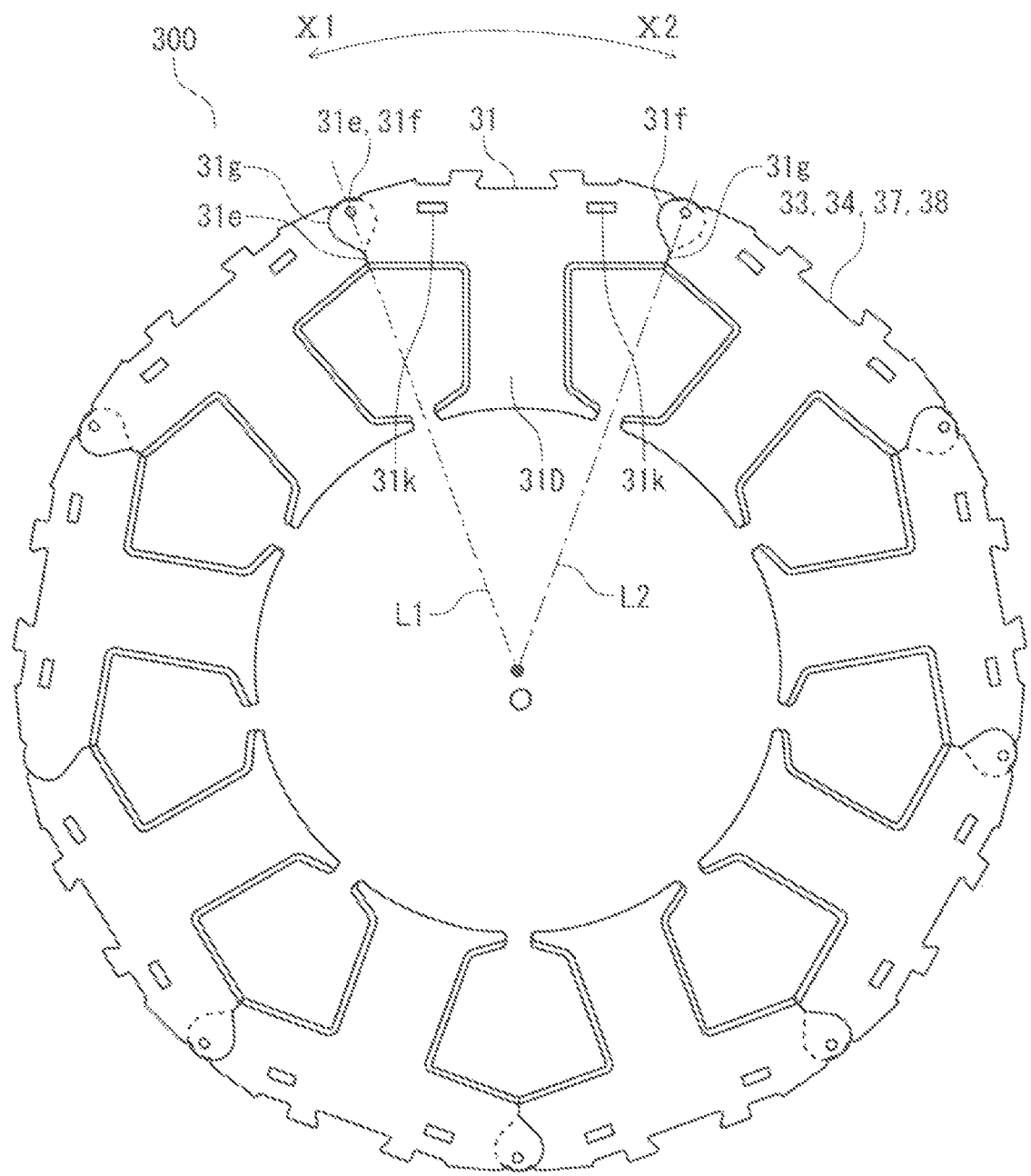
FIG. 14 is a front view showing the structure of a laminated core for a rotary electric machine according to embodiment 3.
Figure 15:
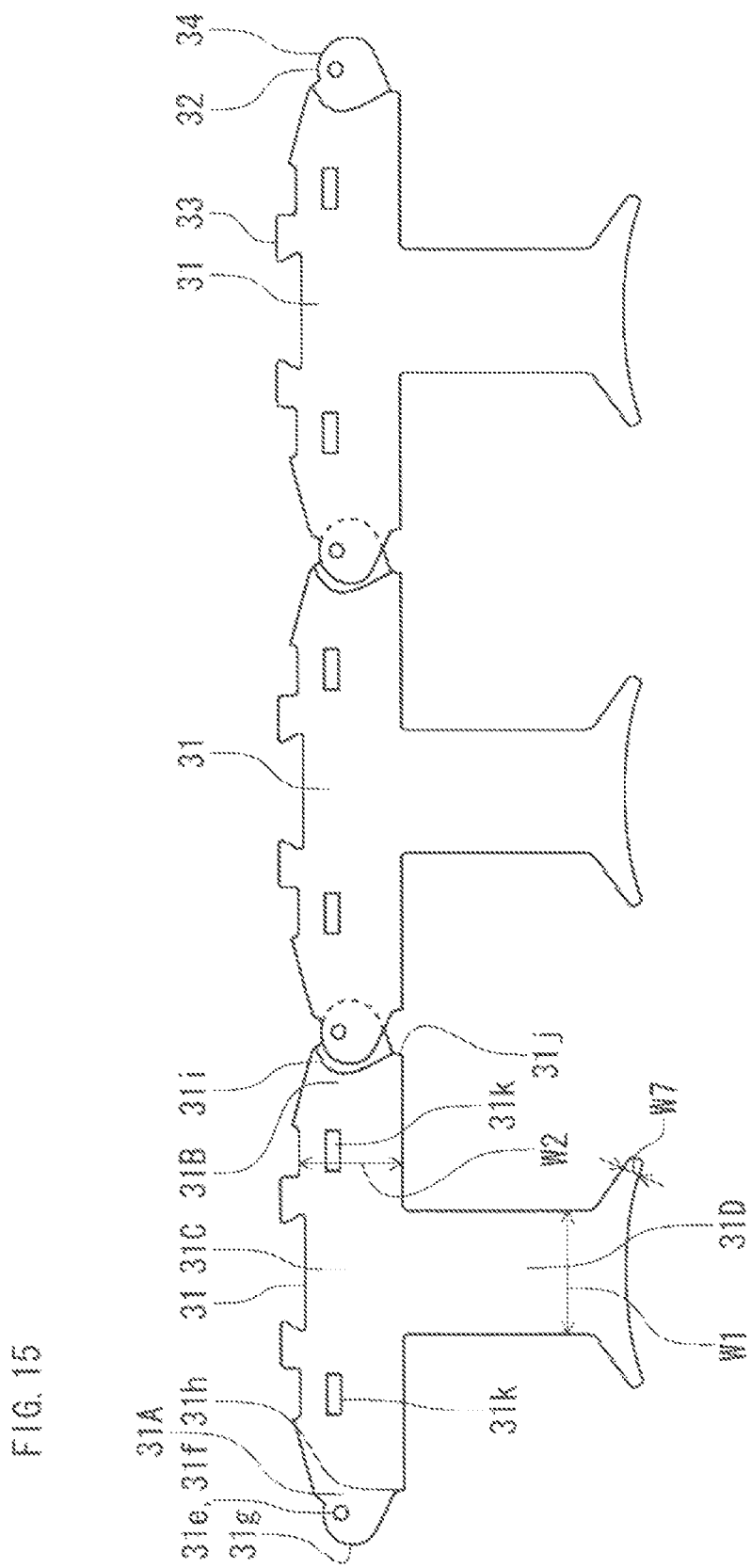
FIG. 15 is a plane view showing a part of a structure in which core members of a second stacked body are arranged in a straight shape, according to embodiment 3.
Figure 16:
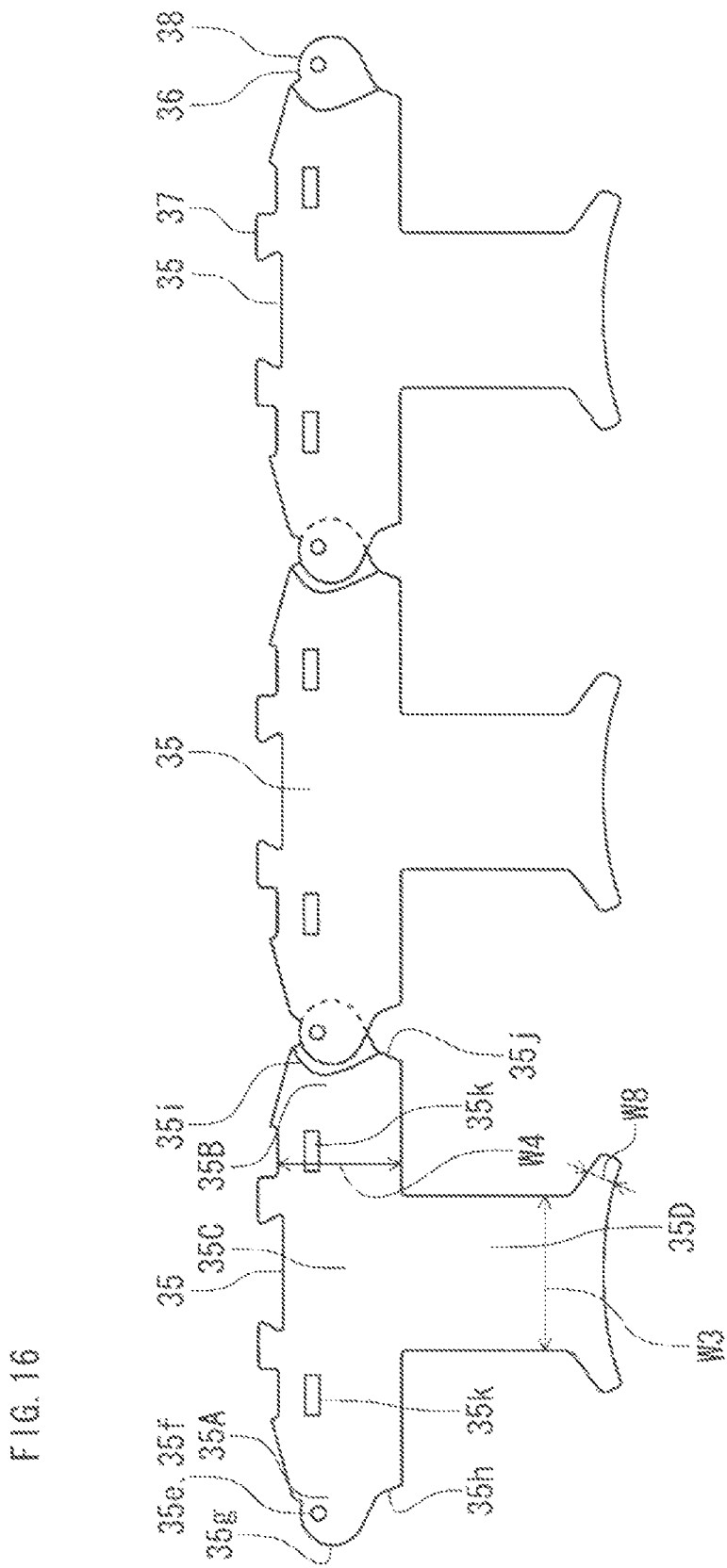
FIG. 16 is a plane view showing a part of a structure in which core members of a first stacked body are arranged in a straight shape, according to embodiment 3.
Figure 17:
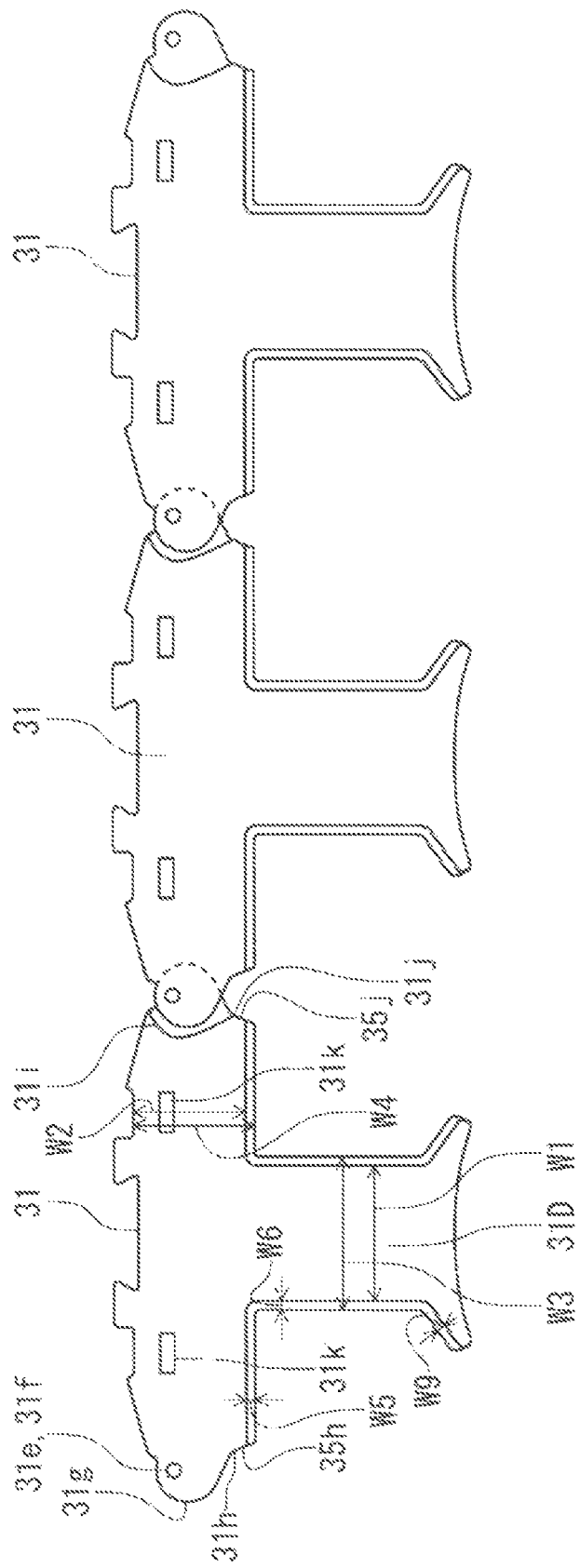
FIG. 17 is a plane view showing a part of a structure in which the core members of the first stacked body and the second stacked body are arranged in a straight shape, according to embodiment 3.
Figure 18:
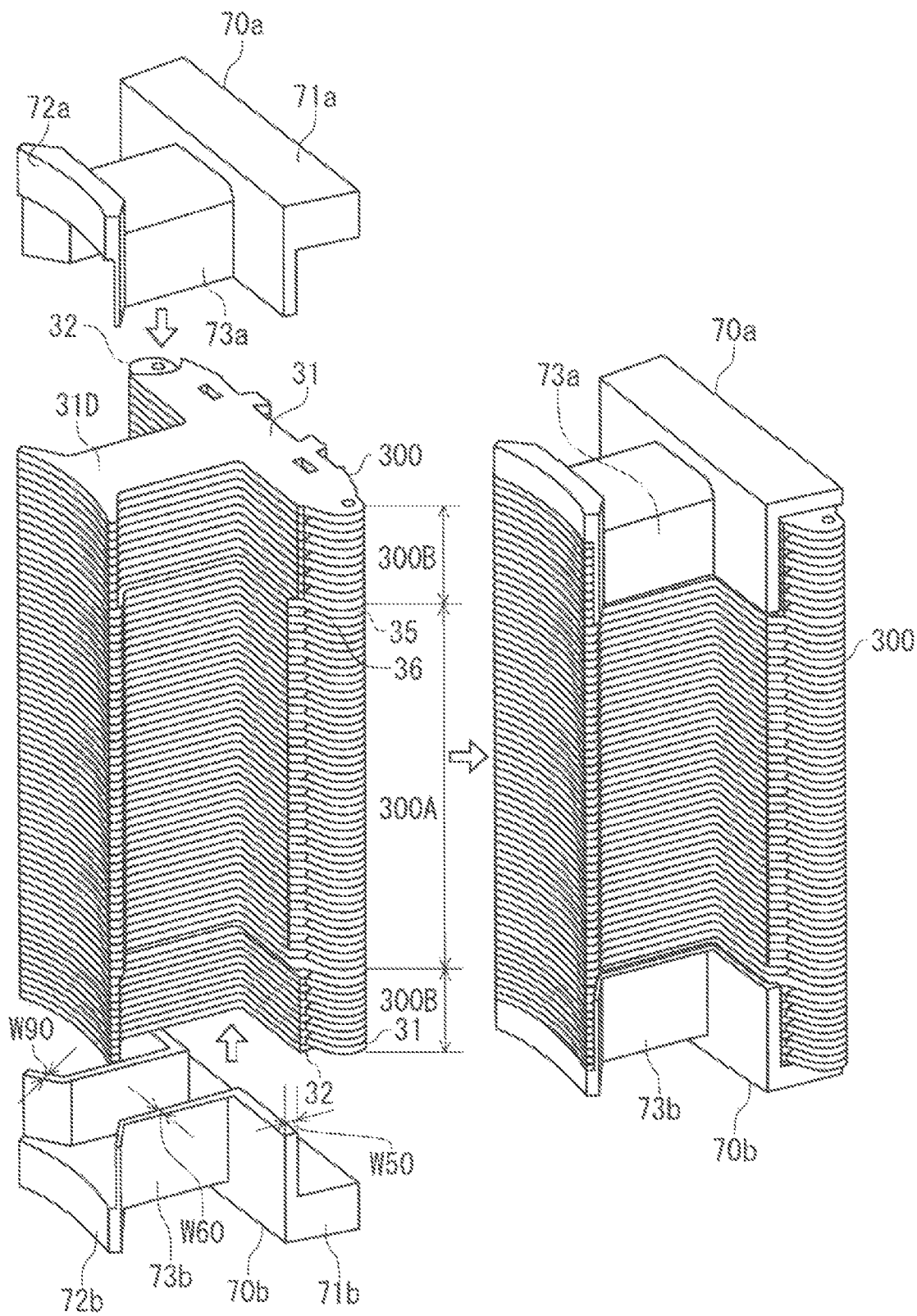
FIG. 18 is a perspective view showing the state in which insulators are attached to core pieces of the laminated core for the rotary electric machine according to embodiment 3.

FIG. 14 is a front view showing the structure of the laminated core for the rotary electric machine according to embodiment 3, FIG. 15 is a plane view showing a part of the structure in which core members of a second stacked body are arranged in a straight shape according to embodiment 3, FIG. 16 is a plane view showing a part of the structure in which core members of a first stacked body are arranged in a straight shape according to embodiment 3, FIG. 17 is a plane view showing a part of the structure in which the core members of the first stacked body and the second stacked body are arranged in a straight shape according to embodiment 3, and FIG. 18 is a perspective view showing the state in which insulators are attached to core pieces of the laminated core for the rotary electric machine according to embodiment 3.

As shown in FIG. 18, a laminated core 300 for the rotary electric machine according to the present embodiment includes the first stacked body 300A formed by stacking first core members 37 and second core members 38, and the second stacked bodies 300B provided on both sides in the axial direction of the first stacked body 300A and formed by stacking first core members 33 and second core members 34.

First, the second stacked body 300B of the laminated core 300 for the rotary electric machine according to the present embodiment will be described.

As shown in FIG. 14 and FIG. 15, the first core member 33 is formed by arranging a plurality of first core pieces 31 while fitting a first end 31A and a second end 31B of the first core pieces 31 adjacent in the circumferential direction. The first core piece 31 is formed from a magnetic sheet such as an electromagnetic steel sheet, and has a back yoke 31C having the projecting first end 31A in the first circumferential direction X1 and the recessed second end 31B in the second circumferential direction X2, and having connection portions 31e, 31f at the first end 31A. And the first core pieces 31 has a magnetic pole tooth 31D protruding inward in the radial direction from the back yoke 31C.

The second core member 34 is formed by arranging a plurality of second core pieces 32 while fitting a first end 32A and a second end 32B of the second core pieces 32 adjacent in the circumferential direction, and the second core member 34 is arranged oppositely in the circumferential direction relative to the first core member 33.

The second stacked body 300B according to the present embodiment is formed by alternately stacking the first core members 33 and the second core members 34 in the axial direction Z. The connection structure of the connection portions 31e, 31f of the first core members 33 and the connection portions of the second core members 34, and the connection structure of recess and projection portions 31k thereof, are the same as in embodiment 1, and therefore description thereof is omitted.

As shown in FIG. 14 and FIG. 15, the first end 31A of the first core piece 31 has a first end surface 31g formed at a radially outer position and having a projecting curved surface shape based on the connection portions 31e, 31f. And the first end 31A has a flat-shaped second end surface 31h formed at a radially inner position and present on a line L1 connecting the axial center of the connection portions 31e, 31f and the axial center O of the rotary electric machine.

The second end 31B of the first core piece 31 has a third end surface 31i formed at a radially outer position and having a recessed curved surface shape based on the connection portions 31e, 31f of another first core piece 31 adjacent to each other. And the second end 31B has a flat-shaped fourth end surface 31j formed at a radially inner position and present on a line L2 connecting the axial center of the connection portions 31e, 31f and the axial center O of the rotary electric machine.

The first end surface 31g having a projecting curved surface shape of the first core piece 31 is in contact with the third end surface 31i having a recessed curved surface shape of another first core piece 31 adjacent to each other. And the flat-shaped second end surface 31h of the first core piece 31 is in contact with the flat-shaped fourth end surface 31j of another first core piece 31 adjacent to each other.

A first end surface having a projecting curved surface shape and a flat-shaped second end surface that are formed at the first end of the second core piece 32, and a third end surface having a recessed curved surface shape and a flat-shaped fourth end surface that are formed at the second end of the second core piece 32, are formed in the same manner as the first end surface, the second end surface, the third end surface, and the fourth end surface of the first core piece 31 described above, except that they are formed oppositely in the circumferential direction.

Next, the first stacked body 300A of the laminated core 300 for the rotary electric machine according to the present embodiment will be described.

As shown in FIG. 14 and FIG. 16, the first core member 37 is formed by arranging a plurality of first core pieces 35 while fitting a first end 35A and a second end 35B of the first core pieces 35 adjacent in the circumferential direction. The first core piece 35 is formed from a magnetic sheet such as an electromagnetic steel sheet, and has: a back yoke 35C having the projecting first end 35A in the first circumferential direction X1 and the recessed second end 35B in the second circumferential direction X2, and having connection portions 35e, 35f at the first end 35A. And the first core piece 35 has a magnetic pole tooth 35D protruding inward in the radial direction from the back yoke 35C.

The second core member 38 is formed by arranging a plurality of second core pieces 32 while fitting a first end 36A and a second end 36B of second core pieces 36 adjacent in the circumferential direction, and the second core member 38 is arranged oppositely in the circumferential direction relative to the first core member 37.

The first stacked body 300A according to the present embodiment is formed by alternately stacking the first core members 37 and the second core members 38 in the axial direction Z. The connection structure of the connection portions 35e, 35f of the first core members 37 and the connection portions of the second core members 38, and the connection structure of recess and projection portions 35k thereof, are the same as in embodiment 1, and therefore description thereof is omitted.

As shown in FIG. 14 and FIG. 16, the first end 35A of the first core piece 35 has a first end surface 35g formed at a radially outer position and having a projecting curved surface shape based on the connection portions 35e, 35f. And the first end 35A has a flat-shaped second end surface 35h formed at a radially inner position and present on a line connecting the axial center of the connection portions 35e, 35f and the axial center O of the rotary electric machine.

The second end 35B of the first core piece 35 has a third end surface 35i formed at a radially outer position and having a recessed curved surface shape based on the connection portions 35e, 35f of another first core piece 35 adjacent to each other. And the second end 35B has a flat-shaped fourth end surface 35j formed at a radially inner position and present on a line connecting the axial center of the connection portions 35e, 35f and the axial center O of the rotary electric machine.

The first end surface 35g having a projecting curved surface shape of the first core piece 35 is in contact with the third end surface 35i having a recessed curved surface shape of another first core piece 35 adjacent to each other. And the flat-shaped second end surface 35h of the first core piece 35 is in contact with the flat-shaped fourth end surface 35j of another first core piece 35 adjacent to each other.

A first end surface having a projecting curved surface shape and a flat-shaped second end surface that are formed at the first end of the second core piece 36, and a third end surface having a recessed curved surface shape and a flat-shaped fourth end surface that are formed at the second end of the second core piece 36, are formed in the same manner as the first end surface, the second end surface, the third end surface, and the fourth end surface of the first core piece 35 described above, except that they are formed oppositely in the circumferential direction.

Connection between the first stacked body 300A and the second stacked body 300B in the axial direction Z is made by connection between the connection portions and the recess and projection portions of the first stacked body 300A, and the connection portions and the recess and projection portions of the second stacked body 300B, in the same manner as described above.

As shown in FIG. 15 to FIG. 17, a radial-direction width W4 of the back yokes of the first core pieces 35 and the second core pieces 36 forming the first stacked body 300A is set to be greater than a radial-direction width W2 of the back yokes of the first core pieces 31 and the second core pieces 32 forming the second stacked body 300B, and the difference (W4−W2) therebetween is defined as W5. A circumferential-direction width W3 of the magnetic pole teeth of the first core pieces 35 and the second core pieces 36 forming the first stacked body 300A is set to be greater than a circumferential-direction width W1 of the magnetic pole teeth of the first core pieces 31 and the second core pieces 32 forming the second stacked body 300B, and the half of the difference (W3−W1) therebetween is defined as W6. A width W8 of magnetic pole tooth ends of the first core pieces 35 and the second core pieces 36 forming the first stacked body 300A is set to be greater than a width W7 of magnetic pole tooth ends of the first core pieces 31 and the second core pieces 32 forming the second stacked body 300B, and the difference (W8−W7) therebetween is defined as W9.

In the same manner as in embodiments 1 and 2, the first stacked body 300A and the second stacked body 300B include core pieces having abutting portions. As the shape and dimension relationship of the core pieces having abutting portions, the shape and dimension relationship of the first core pieces 35 and the second core pieces 36 of the first stacked body 300A, and the first core pieces 31 and the second core pieces 32 of the second stacked body 300B as described above, is applied in the same manner.

FIG. 18 is a perspective view showing the state in which insulators 70a and 70b are attached to the laminated core 300 for the rotary electric machine according to embodiment 3. The insulators 70a, 70b have radially outer flanges 71a, 71b, radially inner flanges 72a, 72b, and winding mounting portions 73a, 73b, respectively. The differences W5, W6, W9 described above are respectively set to be equal to a thickness W50 of winding side walls of the radially outer flanges 71a, 71b of the insulators 70a, 70b, a thickness W60 of the winding mounting portions 73a, 73b, and a thickness W90 of winding side walls of the radially inner flanges 72a, 72b, whereby steps due to attachment of the insulators 70a, 70b to the laminated core 300 are eliminated, thus an advantage that winding can be smoothly performed can be obtained. After the insulators 70a, 70b are attached to the laminated core 300, insulating sheets (not shown) are attached and winding is performed around them.

As described above, according to the present embodiment, in both of the first stacked body and the second stacked body, when the laminated core is formed in an annular shape, a radially inner part of the contact surface formed by the projecting end of the first core piece and the recessed end of the first core piece that are adjacent in the circumferential direction, and a radially inner part of the contact surface formed by the projecting end of the second core piece and the recessed end of the second core piece that are adjacent in the circumferential direction, are respectively positioned in a plane including the center axis of the annular laminated core. Therefore, forces arising between the first core pieces adjacent in the circumferential direction and forces arising between the second core pieces adjacent in the circumferential direction, are equal between right and left and act only in the circumferential direction. Thus, rigidity against external force is enhanced, and roundness of the laminated core for the rotary electric machine is increased.

In addition, irrespective of the magnitude relationship of the radial-direction widths of the back yokes of the first core pieces and the second core pieces, the lengths of straight-shaped end surfaces of the first core pieces and the second core pieces adjacent in the circumferential direction are not misaligned. Therefore, increase in magnetic resistance can be prevented.

The second stacked body of the present embodiment is formed by alternately stacking the first core members and the second core members in the axial direction Z. However, a stacked body obtained by stacking a plurality of first core members and a stacked body obtained by stacking a plurality of second core members may be stacked in order to form the second stacked body.

On one end side in the axial direction of the first stacked body, a second stacked body formed by stacking either of first core members and second core members in the axial direction Z may be provided, and on the other end side in the axial direction of the first stacked body, a second stacked body formed by stacking the others of the first core members and the second core members in the axial direction Z may be provided.

The first stacked body of the present embodiment is formed by alternately stacking the first core members and the second core members in the axial direction Z. However, a stacked body obtained by stacking a plurality of first core members and a stacked body obtained by stacking a plurality of second core members may be stacked in order to form the first stacked body.

Embodiment 4

Hereinafter, a laminated core for a rotary electric machine according to embodiment 4 will be described. Here, the characteristic part of embodiment 4 will be mainly described, and description of the same parts as in the above embodiments is omitted appropriately.

Figure 24:
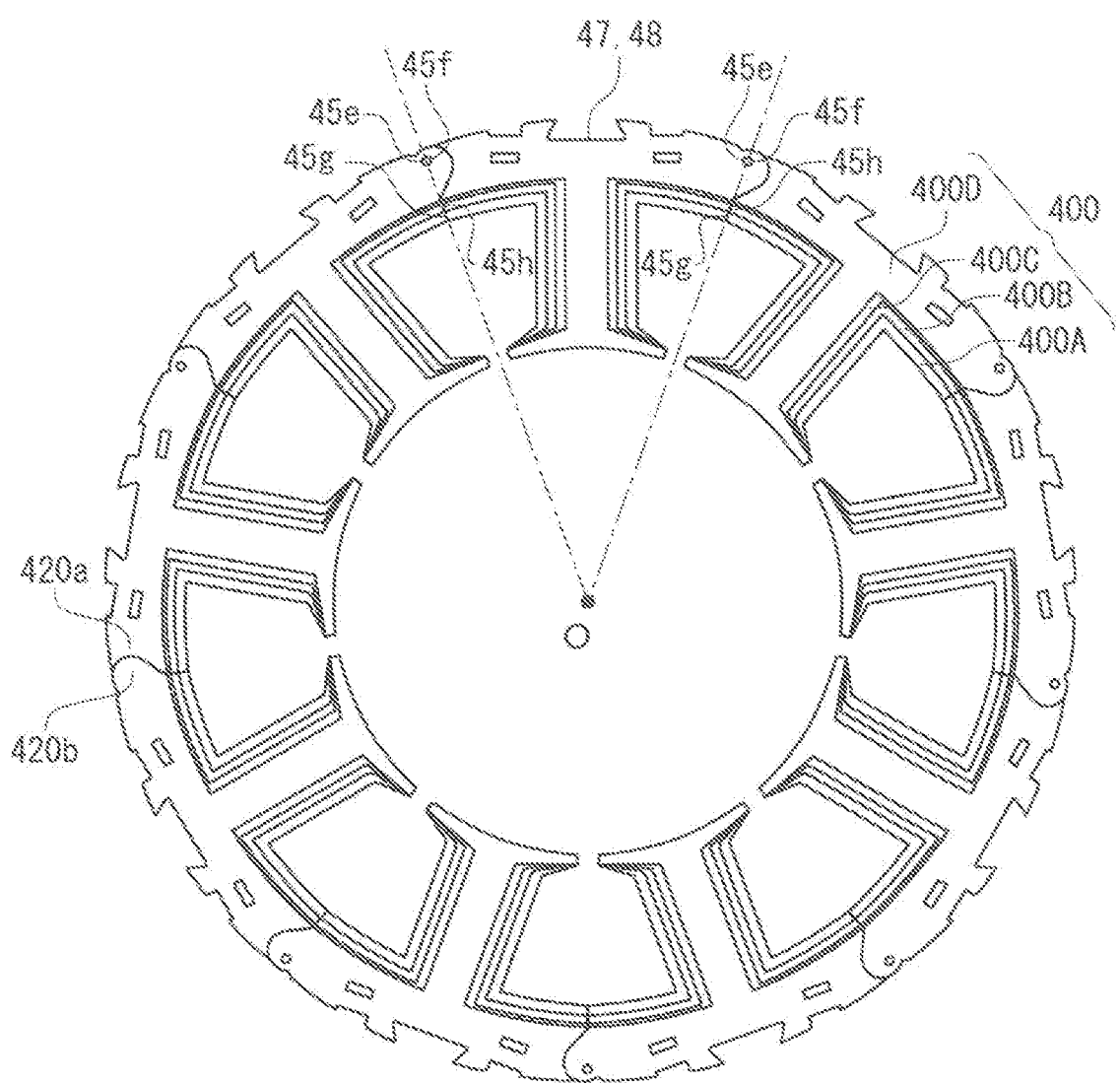
FIG. 24 is a front view showing the structure of a laminated core for a rotary electric machine according to embodiment 4.
Figure 25:
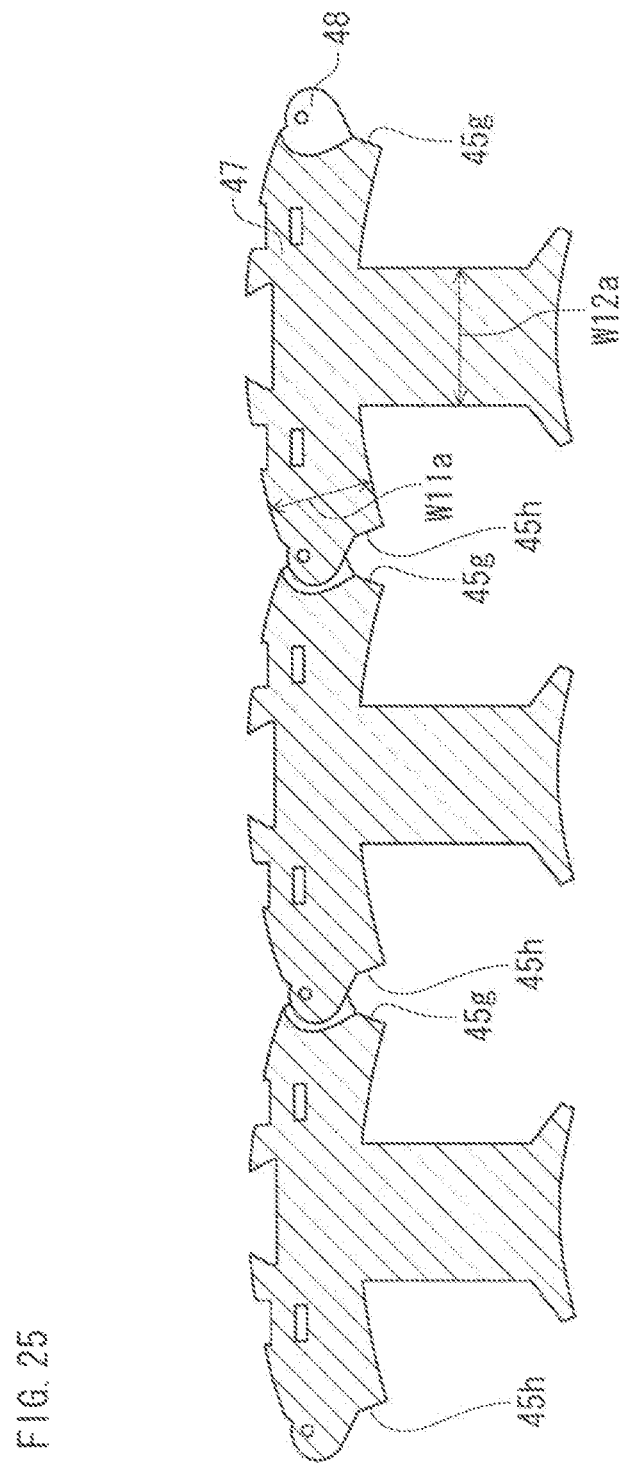
FIG. 25 is a plane view showing a part of the structure in which a first core member and a second core member are arranged in a straight shape, according to embodiment 4.
Figure 26:
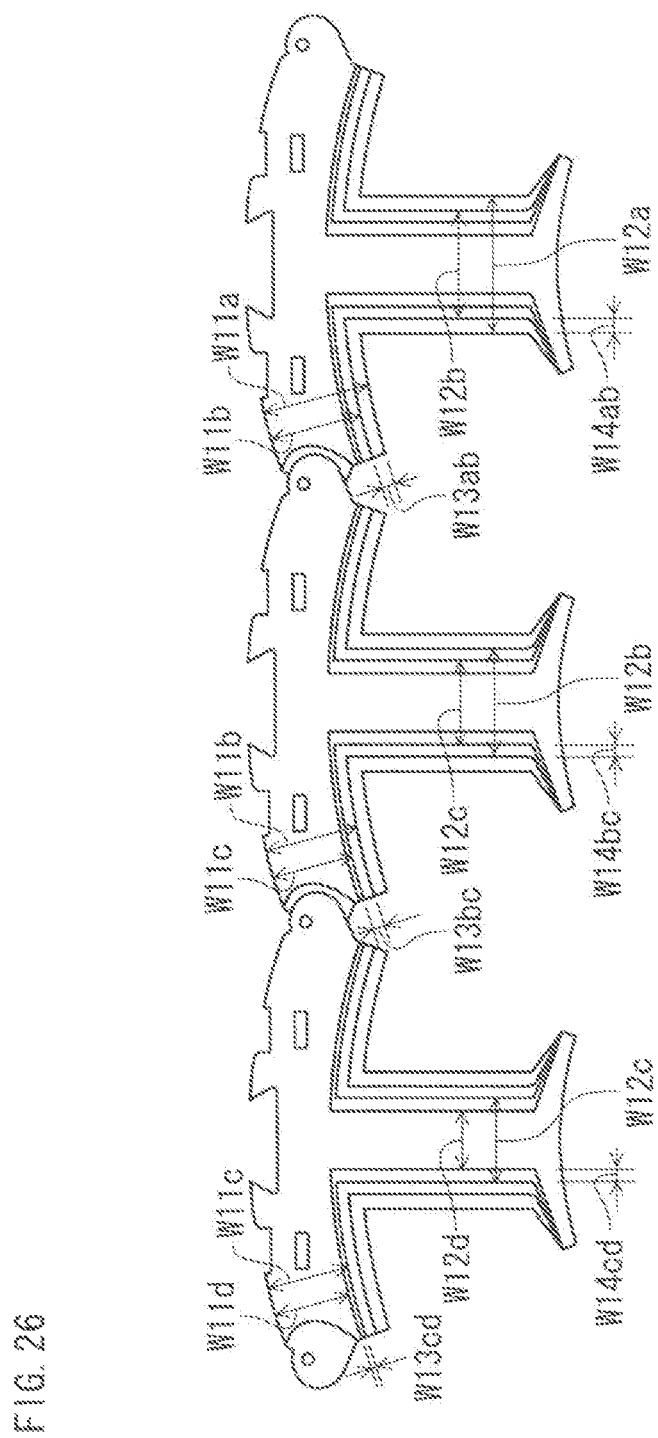
FIG. 26 is a plane view showing a part of the structure in which the laminated cores are arranged in a straight shape, according to embodiment 4.
Figure 27:
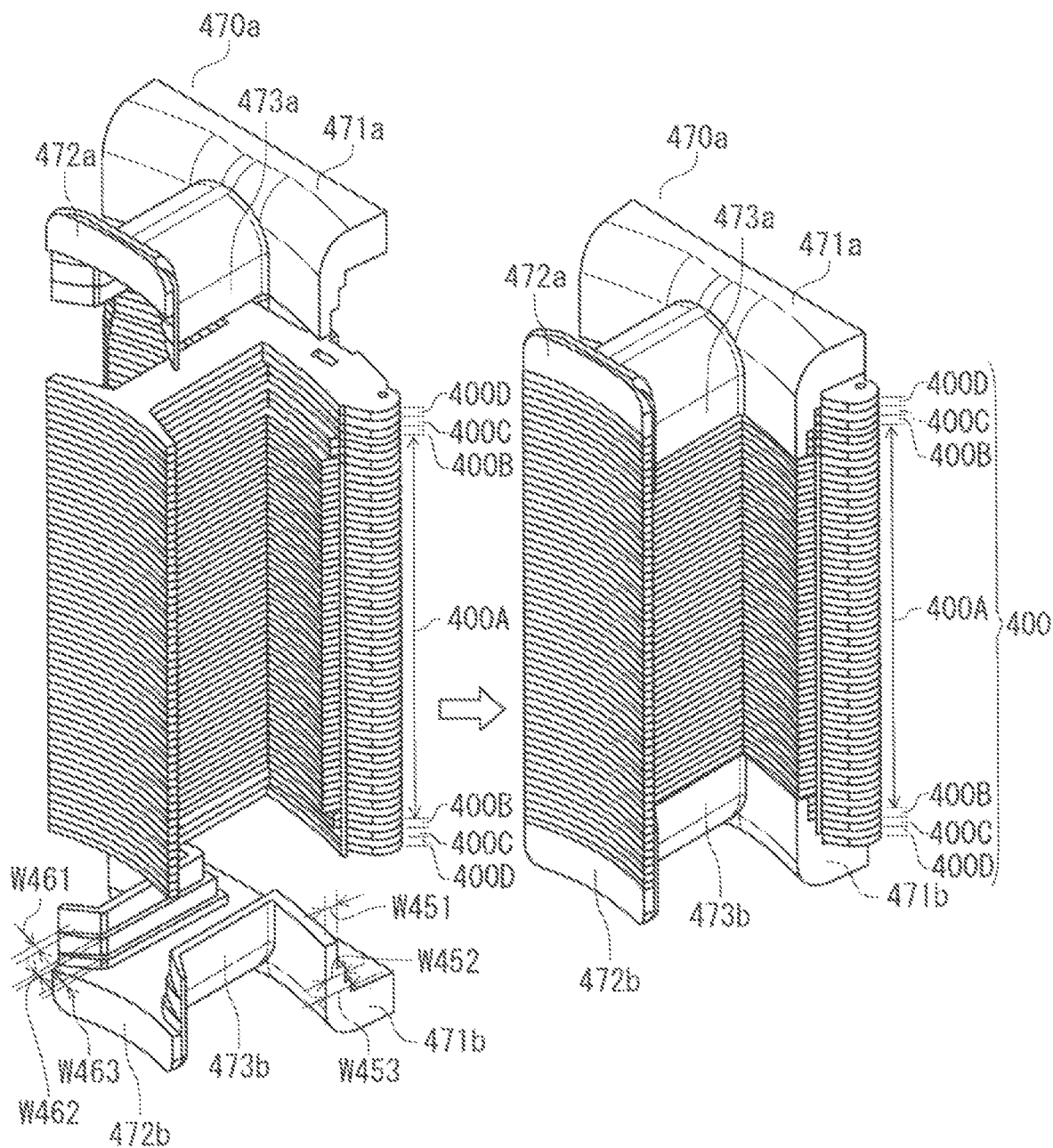
FIG. 27 is a perspective view showing the state in which insulators are attached to the laminated core for the rotary electric machine according to embodiment 4.

FIG. 24 is a front view showing the structure of the laminated core for the rotary electric machine according to embodiment 4, FIG. 25 is a plane view showing a part of the structure in which core members of a stacked body are arranged in a straight shape according to embodiment 4, FIG. 26 is a plane view showing a part of the structure in which core members of plural kinds of stacked bodies are arranged in a straight shape according to embodiment 4, and FIG. 27 is a perspective view showing the state in which insulators are attached to core pieces of the laminated core for the rotary electric machine according to embodiment 4.

As shown in FIG. 27, a laminated core 400 for the rotary electric machine according to the present embodiment is formed by stacking a first stacked body 400A, a second stacked body 400B, a third stacked body 400C, and a fourth stacked body 400D. The first to fourth stacked bodies 400A to 400D are respectively formed by first core members 47 and second core members 48 that are stacked. Of the laminated core 400, the first stacked body 400A is provided at the center part in the axial direction, and the second stacked body 400B, the third stacked body 400C, and the fourth stacked body 400D are provided in this order at each of both ends in the axial direction. The first to fourth stacked bodies 400A to 400D are formed such that the circumferential-direction widths of the magnetic pole teeth of the first core members 47 and the second core members 48, and the radial-direction widths of the back yokes of the first core members 47 and the second core members 48, are decreased stepwise as approaching both ends in the axial direction. In the claims, the second to fourth stacked bodies 400B to 400D are collectively referred to as "second stacked body".

In FIG. 25, in order to discriminate between the first core member 47 and the second core member 48, the first core member 47 is shown by hatching. As shown in FIG. 24 and FIG. 25, the connection structure for circumferential-direction connection in each of the first core member 47 and the second core member 48 is the same as in embodiment 1, and therefore description thereof is omitted. On the radially inner sides of connection portions 45e, 45f for circumferential-direction connection in the first core member 47 and the second core member 48, a flat-shaped first end surface 45g and a flat-shaped second end surface 45h are formed so as to be present on a line connecting the axial center of the connection portions 45e, 45f and the axial center O of the rotary electric machine. The first end surface 45g and the second end surface 45h are in contact with each other. This is applied to all of the first to fourth stacked bodies 400A to 400D.

As shown in FIG. 25 and FIG. 26, a radial-direction width W11a of the back yokes of the first core member 47 and the second core member 48 forming the first stacked body 400A is set to be greater than a radial-direction width W11b of the back yokes of the first core member 47 and the second core member 48 forming the second stacked body 400B, and the difference (W11a−W11b) therebetween is defined as W13ab.

The radial-direction width W11b of the back yokes of the first core member 47 and the second core member 48 forming the second stacked body 400B is set to be greater than a radial-direction width W11c of the back yokes of the first core member 47 and the second core member 48 forming the third stacked body 400C, and the difference (W11b−W11c) therebetween is defined as W13bc.

The radial-direction width W11c of the back yokes of the first core member 47 and the second core member 48 forming the third stacked body 400C is set to be greater than a radial-direction width W11d of the back yokes of the first core member 47 and the second core member 48 forming the fourth stacked body 400D, and the difference (W11c−W11d) therebetween is defined as W13cd.

A circumferential-direction width W12a of the magnetic pole teeth of the first core member 47 and the second core member 48 forming the first stacked body 400A is set to be greater than a circumferential-direction width W12b of the magnetic pole teeth of the first core member 47 and the second core member 48 forming the second stacked body 400B, and the half of the difference (W12a−W12b) therebetween is defined as W14ab.

The circumferential-direction width W12b of the magnetic pole teeth of the first core member 47 and the second core member 48 forming the second stacked body 400B is set to be greater than a circumferential-direction width W12c of the magnetic pole teeth of the first core member 47 and the second core member 48 forming the third stacked body 400C, and the half of the difference (W12b–W12c) therebetween is defined as W14bc.

The circumferential-direction width W12c of the magnetic pole teeth of the first core member 47 and the second core member 48 forming the third stacked body 400C is set to be greater than a circumferential-direction width W12d of the magnetic pole teeth of the first core member 47 and the second core member 48 forming the fourth stacked body 400D, and the half of the difference (W12c–W12d) therebetween is defined as W14cd.

In the same manner as in embodiment 1 and embodiment 2, the first to fourth stacked bodies 400A to 400D have core pieces having abutting portions 420a, 420b. As the shape and dimension relationship of the core pieces having the abutting portions 420a, 420b, the shape and dimension relationship of the first core members 47 and the second core members 48 of the first to fourth stacked bodies 400A to 400D is applied in the same manner.

FIG. 27 is a perspective view showing the state in which insulators 470a, 470b are attached to the laminated core 400 for the rotary electric machine according to embodiment 4. The insulators 470a, 470b have radially outer flanges 471a, 471b, radially inner flanges 472a, 472b, and winding mounting portions 473a, 473b, respectively. The thicknesses of the winding side walls of the radially outer flanges 471a, 471b are set at three levels, and a thickness W451 of the winding side wall closest to the center in the axial direction of the stacked core 400 is set to be equal to the difference W13ab between the radial-direction widths of the back yokes of the first stacked body 400A and the second stacked body 400B.

Among the winding side walls of the radially outer flanges 471a, 471b, a thickness W452 of the winding side wall second-closest to the center in the axial direction of the stacked core 400 is set to be equal to the sum of the difference W13ab between the radial-direction widths of the back yokes of the first stacked body 400A and the second stacked body 400B, and the difference W13bc between the radial-direction widths of the back yokes of the second stacked body 400B and the third stacked body 400C.

Among the winding side walls of the radially outer flanges 471a, 471b, a thickness W453 of the winding side wall farthest from the center in the axial direction of the stacked core 400 is set to be equal to the sum of the difference W13ab between the radial-direction widths of the back yokes of the first stacked body 400A and the second stacked body 400B, the difference W13bc between the radial-direction widths of the back yokes of the second stacked body 400B and the third stacked body 400C, and the difference W13cd between the radial-direction widths of the back yokes of the third stacked body 400C and the fourth stacked body 400D.

The thicknesses of the winding mounting portions 473a, 473b are set at three levels, and a thickness W461 of the winding mounting portions 473a, 473b at the part closest to the center in the axial direction of the laminated core 400 is set to be equal to the half W14ab of the difference between the circumferential-direction widths of the magnetic pole teeth of the first stacked body 400A and the second stacked body 400B.

A difference W462 between the thickness of the winding mounting portions 473a, 473b at the part closest to the center in the axial direction of the laminated core 400 and the thickness of the winding mounting portions 473a, 473b at the part second-closest thereto is set to be equal to the half W14bc of the difference between the circumferential-direction widths of the magnetic pole teeth of the second stacked body 400B and the third stacked body 400C.

A difference W463 between the thickness of the winding mounting portions 473a, 473b at the part second-closest to the center in the axial direction of the stacked core 400 and the thickness of the winding mounting portions 473a, 473b at the part third-closest thereto is set to be equal to the half W14cd of the difference between the circumferential-direction widths of the magnetic pole teeth of the third stacked body 400C and the fourth stacked body 400D.

Thus, steps due to attachment of the insulators 470a, 470b to the laminated core 400 are eliminated, so that there is an advantage that winding can be smoothly performed.

In the present embodiment, the radial-direction widths of the back yokes and the widths of the magnetic pole teeth of the laminated core 400 are changed stepwise. The other configurations are the same as in embodiment 3, and the same connection structure, the same shape of connection portions, and the same end surfaces formed on the radially inner sides of the connection portions as in embodiment 3 are provided. Therefore, the present embodiment provides the same effects as those obtained by the above features in embodiment 3. That is, forces arising between the first core members 47 adjacent in the circumferential direction and forces arising between the second core members 48 adjacent in the circumferential direction, are equal between right and left and act only in the circumferential direction. Thus, rigidity against external force is enhanced, and roundness of the laminated core 400 for the rotary electric machine is increased.

In addition, irrespective of the magnitude relationship of the radial-direction widths of the back yokes of the first core members 47 and the second core members 48, the lengths of the end surfaces 45g, 45h of the first core members 47 and the second core members 48 adjacent in the circumferential direction are not misaligned. Therefore, increase in magnetic resistance can be prevented.

The first to fourth stacked bodies 400A to 400D in the present embodiment are respectively formed by alternately stacking the first core members 47 and the second core members 48 in the axial direction Z. However, a stacked body formed by stacking a plurality of first core members 47 and a stacked body formed by stacking a plurality of second core members 48 may be stacked in order to form some or all of the first to fourth stacked bodies 400A to 400D.

Although the disclosure is described above in terms of various exemplary embodiments and implementations, it should be understood that the various features, aspects, and functionality described in one or more of the individual embodiments are not limited in their applicability to the particular embodiment with which they are described, but they can be applied, alone or in various combinations to one or more of the embodiments of the disclosure.

It is therefore understood that numerous modifications which have not been exemplified can be devised without departing from the scope of the present disclosure. For example, at least one of the constituent components may be modified, added, or eliminated. At least one of the constituent components mentioned in at least one of the preferred embodiments may be selected and combined with the constituent components mentioned in another preferred embodiment.

DESCRIPTION OF THE REFERENCE CHARACTERS 11 first core piece
11A first end 11B second end
11C back yoke
11D magnetic pole tooth
11e, 11f connection portion
11g first end surface
11h second end surface
11i third end surface
11j fourth end surface
11k recess and projection portion
12 second core piece
12A first end
12B second end
12C back yoke
12D magnetic pole tooth
12e, 12f connection portion
12g first end surface
12h second end surface
12i third end surface
12j fourth end surface
12k recess and projection portion
13 first core member
14 second core member
15 laminated core
21 first core piece
21A first end
21B second end
21C back yoke
21D magnetic pole tooth
21e connection portion
21g first end surface
21h second end surface
21i third end surface
21j fourth end surface
21k recess and projection portion
22 second core piece
22A first end
22B second end
22C back yoke
22D magnetic pole tooth
22e connection portion
22g first end surface
22h second end surface
22i third end surface
22j fourth end surface
22k recess and projection portion
23 first core member
24 second core member
25 laminated core
25f connection shaft
31 first core piece
31A first end
31B second end
31C back yoke
31D magnetic pole tooth
31e, 31f connection portion
31g first end surface
31h second end surface
31i third end surface
31j fourth end surface
31k recess and projection portion
32 second core piece
33 first core member
34 second core member
35 first core piece
35A first end
35B second end
35C back yoke
35D magnetic pole tooth
35e, 35f connection portion
35g first end surface
35h second end surface
35i third end surface
35j fourth end surface
35k recess and projection portion
37, 47 first core member
38, 48 second core member
45e, 45f connection portion
45g first end surface
45h second end surface
50 winding
52 rotor
53 rotation shaft
55 frame
70a, 70b insulator
71a, 71b radially outer flange
72a, 72b radially inner flange
73a, 73b winding mounting portion
110A, 110B, 120A, 120B core piece
110a, 110b, 120a, 120b abutting portion
210A, 210B, 220A, 220B core piece
210a, 210b, 220a, 220b abutting portion
300, 400 laminated core
300A, 400A first stacked body
300B, 400B second stacked body
400C third stacked body
400D fourth stacked body
420a, 420b abutting portion
470a, 470b insulator
471a, 471b radially outer flange
472a, 472b radially inner flange
473a, 473b winding mounting portion

The invention claimed is:

1. A laminated core for a rotary electric machine, comprising:
a first core member including a plurality of first core pieces each having a first back yoke and a first magnetic pole tooth protruding inward in a radial direction from the first back yoke, the first back yoke having a first projecting end which has a first connection portion at one end in a first circumferential direction, and having a first recessed end at another end in a second circumferential direction, the first core member being formed by arranging the plurality of first core pieces while fitting the first projecting end of each first core piece and the first recessed end of the adjacent first core piece;
a second core member including a plurality of second core pieces each having a second back yoke and a second magnetic pole tooth protruding inward in the radial direction from the second back yoke, the second back yoke having a second projecting end which has a second connection portion at one end in the second circumferential direction, and having a second recessed end at another end in the first circumferential direction, the second core member being formed by arranging the plurality of second core pieces while fitting the second projecting end of each second core piece and the second recessed end of the adjacent second core piece, wherein
the first core member and the second core member are stacked while the first projecting ends of the first core pieces and the second projecting ends of the second core pieces are overlaid in an axial direction and connected rotatably by the respective connection portions, and when the laminated core is formed in an annular shape, a first radially inner part of a first contact surface formed by the first projecting end of the first core piece and the first recessed end of the first core piece that are adjacent in a circumferential direction, and a second radially inner part of a second contact surface formed by the second projecting end of the second core piece and the second recessed end of the second core piece that are adjacent in the circumferential direction, are respectively positioned in a plane including a center axis of the laminated core;

a first stacked body formed by stacking the first core member and the second core member;

second stacked bodies provided on both sides in the axial direction of the first stacked body and formed by stacking at least one of the first core member and the second core member, wherein radial-direction widths of the back yokes and circumferential-direction widths of the magnetic pole teeth of the first core pieces and the second core pieces of the first stacked body, are greater than radial-direction widths of the back yokes and circumferential-direction widths of the magnetic pole teeth of the first core pieces and the second core pieces of the second stacked bodies, when the laminated core is formed in an annular shape, steps formed by the difference between radial-direction widths of the back yokes of the first core pieces and the second core pieces of the first stacked body, and radial-direction widths of the back yokes of the first core pieces and the second core pieces of the second stacked bodies, are positioned on more inner side in the radial direction than the first radially inner part of the first contact surface formed by the first projecting end of the first core piece and the first recessed end of the first core piece that are adjacent in the circumferential direction in the second stacked bodies, and the second radially inner part of the second contact surface formed by the second projecting end of the second core piece and the second recessed end of the second core piece that are adjacent in the circumferential direction in the second stacked bodies;

insulators including radially outer flanges, radially inner flanges and winding mounting portions are attached to the laminated core, and a winding side wall of the radially outer flanges that is positioned on the side in which winding is wound is fitted to the steps, a radial-direction thickness of the winding side wall is equal to a radial-direction length of the steps, a surface in the winding side wall which is opposed to the laminated core in the radial-direction is formed in one plane having no step.

2. The laminated core for the rotary electric machine according to claim 1, wherein when the laminated core is formed in an annular shape, the first radially inner part of the first contact surface formed by the first projecting end of the first core piece and the first recessed end of the first core piece that are adjacent in the circumferential direction, and the second radially inner part of the second contact surface formed by the second projecting end of the second core piece and the second recessed end of the second core piece that are adjacent in the circumferential direction, are respectively positioned in a plane including the center axis of the laminated core and a center axis of the connection portion.

3. The laminated core for the rotary electric machine according to claim 2, wherein each second stacked body includes plural types of stacked bodies that are different in the radial-direction widths of the back yokes and the circumferential-direction widths of the magnetic pole teeth, and the stacked bodies forming each second stacked body are stacked in such an order that the radial-direction widths of the back yokes and the circumferential-direction widths of the magnetic pole teeth are gradually reduced toward both sides in the axial direction.

4. The laminated core for the rotary electric machine according to claim 3, wherein the first connection portions of the first core member are formed by first recesses and first projections provided on front and back surfaces of the first core member, and the second connection portions of the second core member are formed by second recesses and second projections provided on front and back surfaces of the second core member, and the first projections that are the first connection portions of the first core member are fitted to the second recesses that are the second connection portions of the second core member, and the second projections that are the second connection portions of the second core member are fitted to the first recesses that are the first connection portions of the first core member.

5. The laminated core for the rotary electric machine according to claim 3, wherein through holes are respectively formed as the connection portions of the first core member and the second core member, and the first core member and the second core member are connected in the axial direction by fixing connection shafts to the through holes.

6. The laminated core for the rotary electric machine according to claim 2, wherein the first connection portions of the first core member are formed by first recesses and first projections provided on front and back surfaces of the first core member, and the second connection portions of the second core member are formed by second recesses and second projections provided on front and back surfaces of the second core member, and the first projections that are the first connection portions of the first core member are fitted to the second recesses that are the second connection portions of the second core member, and the second projections that are the second connection portions of the second core member are fitted to the first recesses that are the first connection portions of the first core member.

7. The laminated core for the rotary electric machine according to claim 2, wherein through holes are respectively formed as the connection portions of the first core member and the second core member, and the first core member and the second core member are connected in the axial direction by fixing connection shafts to the through holes.

8. The laminated core for the rotary electric machine according to claim 1, wherein each second stacked body includes plural types of stacked bodies that are different in the radial-direction widths of the back yokes and the circumferential-direction widths of the magnetic pole teeth, and the stacked bodies forming each second stacked body are stacked in such an order that the radial-direction widths of the back yokes and the circumferential-direction widths of the magnetic pole teeth are gradually reduced toward both sides in the axial direction.

9. The laminated core for the rotary electric machine according to claim 8, wherein the first connection portions of the first core member are formed by first recesses and first projections provided on front and back surfaces of the first core member, and the second connection portions of the second core member are formed by second recesses and second projections provided on front and back surfaces of the second core member, and the first projections that are the first connection portions of the first core member are fitted to the second recesses that are the second connection portions of the second core member, and the second projections that are the second connection portions of the second core member are fitted to the first recesses that are the first connection portions of the first core member.

10. The laminated core for the rotary electric machine according to claim 8, wherein through holes are respectively formed as the connection portions of the first core member and the second core member, and the first core member and the second core member are connected in the axial direction by fixing connection shafts to the through holes.

11. The laminated core for the rotary electric machine according to claim 1, wherein the first connection portions of the first core member are formed by first recesses and first projections provided on front and back surfaces of the first core member, and the second connection portions of the second core member are formed by second recesses and second projections provided on front and back surfaces of the second core member, and the first projections that are the first connection portions of the first core member are fitted to the second recesses that are the second connection portions of the second core member, and the second projections that are the second connection portions of the second core member are fitted to the first recesses that are the first connection portions of the first core member.

12. The laminated core for the rotary electric machine according to claim 1, wherein through holes are respectively formed as the connection portions of the first core member and the second core member, and the first core member and the second core member are connected in the axial direction by fixing connection shafts to the through holes.

13. A rotary electric machine comprising:

the laminated core for the rotary electric machine according to claim 1, the laminated core being formed in an annular shape;

windings wound around the magnetic pole teeth of the laminated core for rotary electric machine; and a rotor provided on a radially inner side of the laminated core for the rotary electric machine.

14. The laminated core for the rotary electric machine according to claim 1, wherein the first back yoke located at an end in the first circumferential direction in the first core member is provided with first projecting abutting portions having no connection portions at the end in the first circumferential direction, the second back yoke located at an end in the second circumferential direction in the second core member is provided with second projecting abutting portions having no connection portions at the end in the first circumferential direction, when the laminated core is formed in an annular shape, a first radially inner part of a first contact surface formed by the first projecting abutting portions in the first core member and first recessed abutting portions at another end in the second circumferential direction of the first back yoke that are adjacent in a circumferential direction in the first core member, are positioned in a plane including a center axis of the laminated core, and when the laminated core is formed in an annular shape, a second radially inner part of a second contact surface formed by the second projecting abutting portions in the second core member and second recessed abutting portions at another end in the first circumferential direction of the second back yoke that are adjacent in the circumferential direction in the second core member, are positioned in the plane including the center axis of the laminated core.

* * * * *